United States Patent

Shirahama et al.

[11] Patent Number: 6,145,922
[45] Date of Patent: Nov. 14, 2000

[54] REINFORCED CONSTRUCTION FOR REAR WHEEL HOUSING IN AUTOMOBILE, AND RESTRAINT DEVICE FOR USE IN SAME

[75] Inventors: Mitsuharu Shirahama; Kenji Isaka; Junji Kitagawa, all of Aichi-ken; Takuo Yanagihara; Yasuhiko Mori, both of Gifu-ken; Kazuhiro Narusaka, Aichi-ken, all of Japan

[73] Assignees: Toyota Jidosha Kabushiki Kaisha, Toyota; Gifu Shatai Kogyo Kabushiki Kaisha, Kagamihara, both of Japan

[21] Appl. No.: 09/269,228

[22] PCT Filed: Sep. 4, 1997

[86] PCT No.: PCT/JP97/03105

§ 371 Date: Mar. 23, 1999

§ 102(e) Date: Mar. 23, 1999

[87] PCT Pub. No.: WO98/13250

PCT Pub. Date: Apr. 2, 1998

[51] Int. Cl.[7] .......................................................... B60J 7/00
[52] U.S. Cl. ................... 296/188; 296/203.01; 296/205; 296/30
[58] Field of Search ............................... 296/188, 203.01, 296/205, 203.04, 30, 37.16

[56] References Cited

U.S. PATENT DOCUMENTS

| | | | |
|---|---|---|---|
| 4,217,970 | 8/1980 | Chika | 296/188 |
| 4,563,035 | 1/1986 | Hirakami et al. | 296/188 |
| 4,629,023 | 12/1986 | Carpanelli et al. | 296/205 |
| 5,364,128 | 11/1994 | Ide | 296/188 |
| 5,381,871 | 1/1995 | Ohta | 296/188 |
| 5,419,609 | 5/1995 | Kmiec et al. | 296/188 |
| 5,720,511 | 2/1998 | Benedyk | 296/203.01 |
| 5,788,322 | 8/1998 | Wolf et al. | 296/203.04 |
| 5,857,725 | 1/1999 | Croke et al. | 296/37.16 |
| 6,053,566 | 4/2000 | Aghssa et al. | 296/203.01 |

FOREIGN PATENT DOCUMENTS

| | | |
|---|---|---|
| 64-26582 | 2/1989 | Japan . |
| 4-365679 | 12/1992 | Japan . |
| 5-338558 | 12/1993 | Japan . |

*Primary Examiner*—Joseph D. Pape
*Assistant Examiner*—Kiran Patel
*Attorney, Agent, or Firm*—Burns, Doane, Swecker & Mathis, LLP

[57] ABSTRACT

A reinforcing construction for rear wheel housings in automobiles, provided on the right and left sides of a car body, which comprises a connection member (24) having engagement portions at two axial ends thereof, respectively, and extending between right and left suspension towers, a first restraint device (26) mounted on one of the right and left rear wheel housings for restraining one of the two engagement portions on the connection member, and structures mounted on the other of the right and left rear where housings for restraining the other of the two engagement portions. The first restraint device comprises two lock levers (32, 34) supported independently of each other and swingably on the rear where housings to be capable of releasing and restraining one of the two engagement portions on the connection member, each of the lock levers having an inclined surface (33, 35) which is adapted to come into frictional contact with one of the engagement portions. The two inclined surfaces are inclined such that inclination directions in a widthwise direction of the car body are opposite to each other.

23 Claims, 23 Drawing Sheets

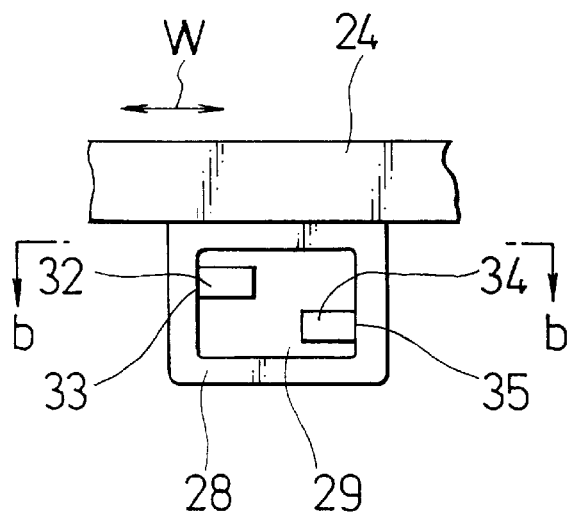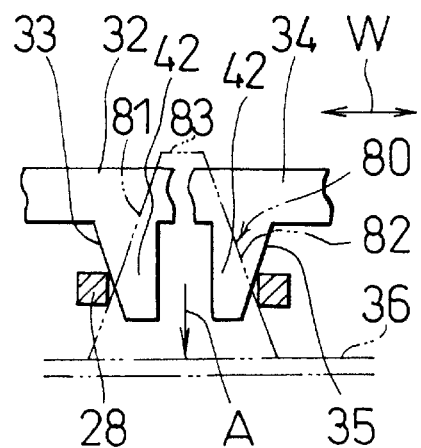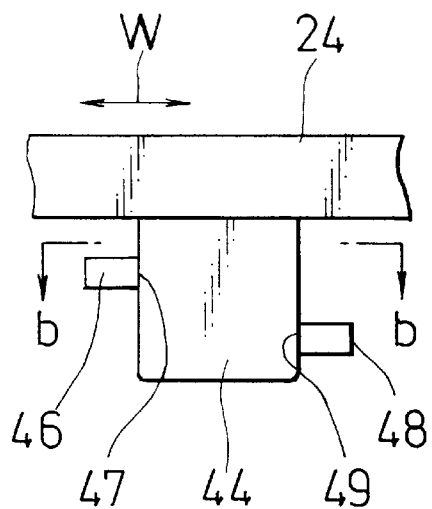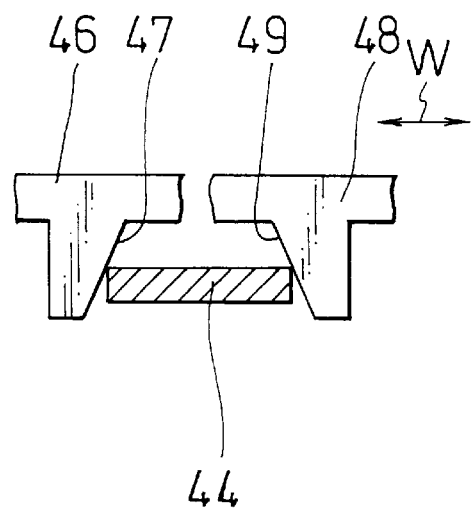

REINFORCED CONSTRUCTION FOR REAR WHEEL HOUSING IN AUTOMOBILE, AND RESTRAINT DEVICE FOR USE IN SAME

TECHNICAL FIELD

This invention relates to a reinforcing construction for rear wheel housings in an automobile and to a restraint device for use in same, and more particularly, to those for an automobile called wagon or van in which rear wheel housings covering the rear wheels face a passenger compartment and the space between the right and left rear wheel housings is utilized as a space for accommodation or loading.

BACKGROUND ART

An automobile has suspension towers in rear wheel housings with which struts of the suspension or suspension arms supporting rear wheels are connected. As a result, since forward and backward force and lateral force act on the rear wheel housings while the automobile is running, a connection member is sometimes extended between the right and left wheel housings in a wagon or van-type automobile so as to enhance rigidity to the lateral force (Japanese Utility Model Appln. Public Disclosure No. 64-26582 Official Gazette).

In a wagon or van-type automobile, sometimes collapsible seats are installed in a space between the right and left rear wheel housings to be used as a space for accommodating passengers or for loading freight with the seats collapsed or moved. Therefore, in an automobile with a connection member extended between rear wheel housings, the connection member is often attached or removed. For this reason, it is preferable to connect a connection member and rear wheel housings by removable restraint means. Such restraint means is exemplified, for example, in FIGS. 15–18 of the above-mentioned Official Gazette.

According to the restraint means described in the Official Gazette, a bracket having a one-side open rectangle-shaped or U-shaped configuration in vertical section is attached to each suspension tower of rear wheel housings with its opening directed upward, a horizontal piece is extended outward from one side of the bracket opening, and a lever swingable about a horizontal axis is attached to the other side of the opening. Also, a pair of hooks having one-side open rectangle-shaped configuration in plane are attached horizontally to an end of a connection member in the directions opposite to each other. To connect the connection member, one of their hooks is inserted into the horizontal piece to hook, the lever is turned downward such that another hook is fitted into a recess in the lever. To disconnect, the lever is turned upward to release and remove the one hook from the horizontal piece of the bracket.

DISCLOSURE OF THE INVENTION

Rigidity can be enhanced by connecting right and left rear wheel housings with the connection member because a load entering one of rear wheel housings is transmitted to the other rear wheel housing through the connection member to be shared by both rear wheel housings. However, according to the restraint means, when an error is caused in the length of the connection member and/or the distance between the rear wheel housings of the car body, the restraint means lacks measures to absorb the error, so that a clearance to displace the connection member in an axial direction is apt to be caused between the pair of hooks and the bracket. Once such a clearance is caused, a load entering one of the rear wheel housings cannot be transmitted to the other rear wheel housing through the connection member, so that sufficient rigidity cannot be ensured.

The present invention provides a reinforcing construction of rear wheel housings of an automobile capable of ensuring sufficient rigidity at any time even when an error occurs in the length of a connection member or in the distance between right and left rear wheel housings as well as a restraint device suitable for use in the reinforcing construction.

The present invention relates to a structure for reinforcing rear wheel housings of an automobile having suspension towers on the right and left sides of a car body. The reinforcing construction comprises a connection member having an engagement portion provided at each of two axial ends, the connection member being extended between the right and left suspension towers, a first restraint device mounted on one of the right and left rear wheel housings to restrain one of the two engagement portions, and restraint means mounted on the other rear wheel housing to restrain the other engagement portion of the connection member.

The first restraint device includes two lock levers swingably supported independently of each other on the one of the rear wheel housings. Each lock lever is capable of releasing and restraining one of the engagement portions of the connection member and has an inclined surface to come into frictional contact with one of the engagement portions when it swings to restrain the one engagement portion. The two inclined surfaces are inclined such that as the swinging amounts of the lock levers toward restraining one of the engagement portions increase, frictional force against the engagement portion gradually increases and that inclination directions in a widthwise direction of the car body are opposite to each other.

The restraint means is one of the following: a) a restraint device of substantially the same structure as that of the first restraint device; b) a second restraint device provided with one lock lever having two inclined surfaces swingably supported on the other of the rear wheel housings and capable of releasing and restraining the other of the engagement portions of the connection member, wherein the two inclined surfaces come into frictional contact with the other of the engagement portions when the lock lever swings so as to restrain the other of the engagement portions, and the two inclined surfaces are inclined such that, as the swinging amount of the lock lever toward restraining the other of the engagement portions of one end portion thereof increases, the frictional force against the engagement portion gradually increases, and that the inclination directions in the widthwise direction of the car body are opposite to each other; c) a plate material or a rod having an inclined surface on each of the two sides and mounted on the other of rear wheel housings with the other end portion thereof, the two inclined surfaces being inclined to spread like a fan from a free end to the mounted end.

When the rear wheel housings having the suspension towers should be reinforced, the connection member is extended between the right and left suspension towers. One of the two engagement portions of the connection member is opposed to the first restraint device, and the other of the two engagement portions is opposed to the restraint means. First, the other of the engagement portions is brought into frictional contact with the two inclined surfaces. Then, when the two lock levers of the first restraint device are operated to bring the respective inclined surfaces of the two lock levers into frictional contact with one of the engagement portions, loads directed toward both ends in the axial direction of the connection member, that is, loads opposite to each other are applied from the two inclined surfaces.

Since the two inclined surfaces respectively provided at the two lock levers of the restraint device are inclined such that as the swinging amounts toward the engagement portion of the two lock levers increases, the frictional force with the engagement portion increases, and that the inclination directions in the widthwise direction of the car body are opposite to each other, axial force directed toward both ends in the axial direction of the connection member can be generated. This makes the connection member axially displaced to fill a small clearance to get rid of rattling, so that great rigidity can be given to the right and left rear wheel housings. Further, since the two lock levers swing independently of each other and can vary the degree of engagement between each inclined surface and the engagement portion, an error in the distance between the right and left rear wheel housings or an error in the length of the connection member can be absorbed. Also, only by operating the two lock levers of the restraint device, the engagements with the engagement portion of the connection member are restrained or released, whereby the connection member can be rapidly and readily attached or removed.

The connection member is preferably made hollow to house therein a tonneau cover so as to be pulled out or has a hollow casing attached to the connection member to house therein the tonneau cover so as to be pulled out.

Since the connection member is formed as a supporter of the tonneau cover, the rear wheel housings of the automobile can be reinforced without any restriction to the interior design and without sacrificing the loading space, while a view from outside can be shut out by covering freight loaded in the loading space with the tonneau cover.

According to one embodiment of the present invention, operation means for the two lock levers of the first restraint device includes one handle swingably supported on the rear wheel housing and two extension coil springs connecting the handle and each of the two lock levers.

Since two lock levers can be simultaneously operated by one handle and each lock lever is subjected to the spring force of the extension coil spring, by operating only one handle, the two inclined surfaces can be simultaneously brought into contact with the engagement portion of the connection member, and the engagement portion can generate axial force suitable for the clearance, thereby restraining the connection member.

According to another embodiment of the present invention, the operation means for the two lock levers of the first restraint device includes one handle supported on the rear wheel housings so as to swing about a fulcrum, an auxiliary handle supported on the rear wheel housings so as to swing about a fulcrum located between the fulcrum of the handle and the fulcrum of the lock levers, and two extension coil springs connecting the auxiliary handle and each of the two lock levers. The auxiliary handle is swung by the handle when the handle swings so as to swing the two lock of levers toward the engagement portion of the connection member.

Since two lock levers are simultaneously operated by one handle and the lock levers are subjected to the spring forces of the extension coil springs, by operating only one handle, the two inclined surfaces can be brought into contact with the engagement portion of the connection member to generate axial force suitable for the clearance from the engagement portion and restrain the connection member. In addition, the auxiliary handle is swung by the handle and the swinging fulcrum of the auxiliary handle is located between the fulcrum of the handle and the fulcrum of the lock levers, so that when the handle swings, the loci of the coil springs approach the fulcrum of the auxiliary handle. Consequently, the operation force can be reduced to facilitate the operation of the handle.

According to still another embodiment, the operation means for the two lock levers of the first restraint device includes one handle swingably supported on the rear wheel housings, two extension coil springs connecting the handle and each of the two lock levers, and an extension coil spring acting to reduce the operation force when the handle is swung by the operation force to a predetermined position, and attached to the handle and the rear wheel housings.

Since two lock levers are simultaneously operated by one handle and the lock levers are subjected to the spring forces of the extension coil springs, by operating only one handle, the two inclined surfaces are simultaneously brought into contact with the engagement portion of the connection member to generate axial force suitable for the clearance and restrain the connection member. In addition, the operation force is reduced when the handle swings to a predetermined position, so that the operation of the handle can be facilitated.

In case the extension coil spring for reducing the operation force is provided, a stopper for stopping the movements of the lock levers can be provided if the engagement portion of the connection member is not located at the positions of the two lock levers of the first restraint device.

When the engagement portion of the connection member is not located at the positions of the lock levers, if the handle is swung, the two extension coil springs extended between the handle and the lock levers do not substantially work, so that the extension coil spring which reduces the operation force when the handle has swung to the predetermined position give the handle tensile force to abruptly swing the handle. By providing the stopper, an abrupt swinging of the handle can be prevented.

BRIEF DESCRIPTION OF THE DRAWINGS

FIG. 4(a) is a rear elevation schematically illustrating an embodiment of inclined surfaces of lock levers and an engagement portion, and FIG. 4(b) is a sectional view as viewed in the direction of the line b—b of FIG. 4(a).

FIG. 5(a) is a rear elevation schematically illustrating another embodiment of the inclined surfaces of the lock levers and the engagement portion, and FIG. 5(b) is a sectional view as viewed in the direction of the line b—b of FIG. 5(a).

BEST MODE FOR CARRYING OUT THE INVENTION

Figure 1:
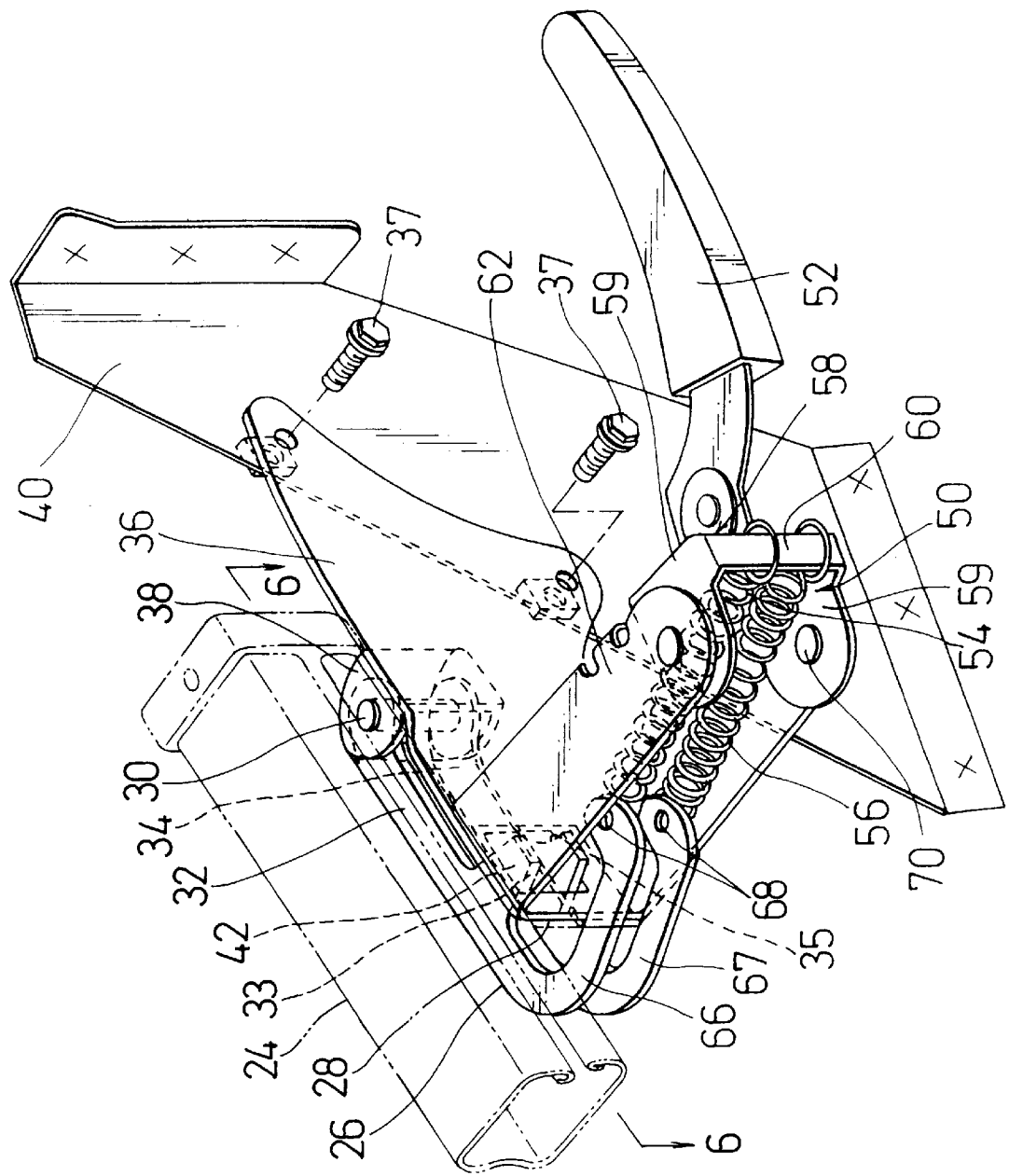
FIG. 1 is a detailed perspective view of the reinforced construction of the rear wheel housings of an automobile relative to the present invention, showing only one side of the car body, in which the rear wheel housings are omitted.
Figure 2:
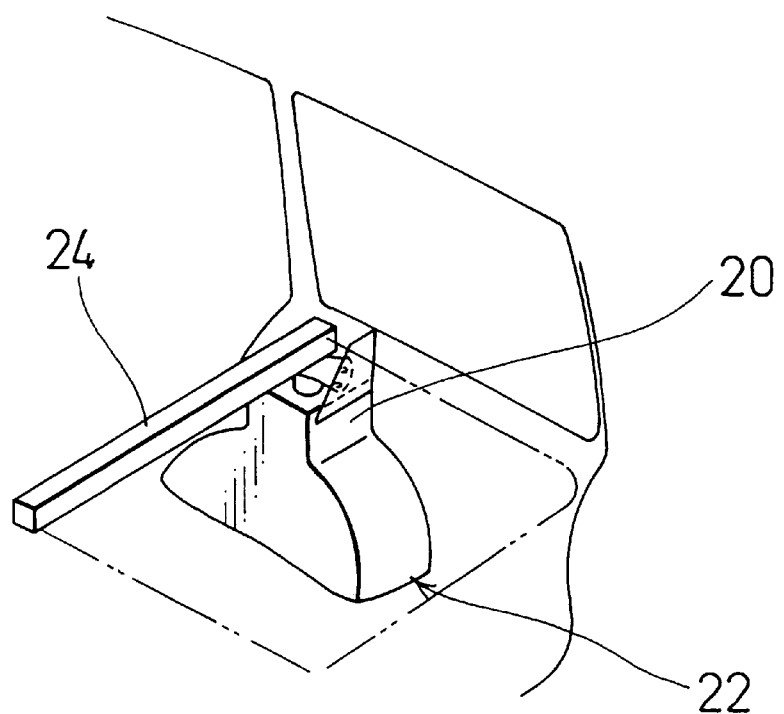
FIG. 2 is a perspective view of the reinforced construction of the rear wheel housing portions of an automobile relative to the present invention, showing only one side of the car body.
Figure 3:
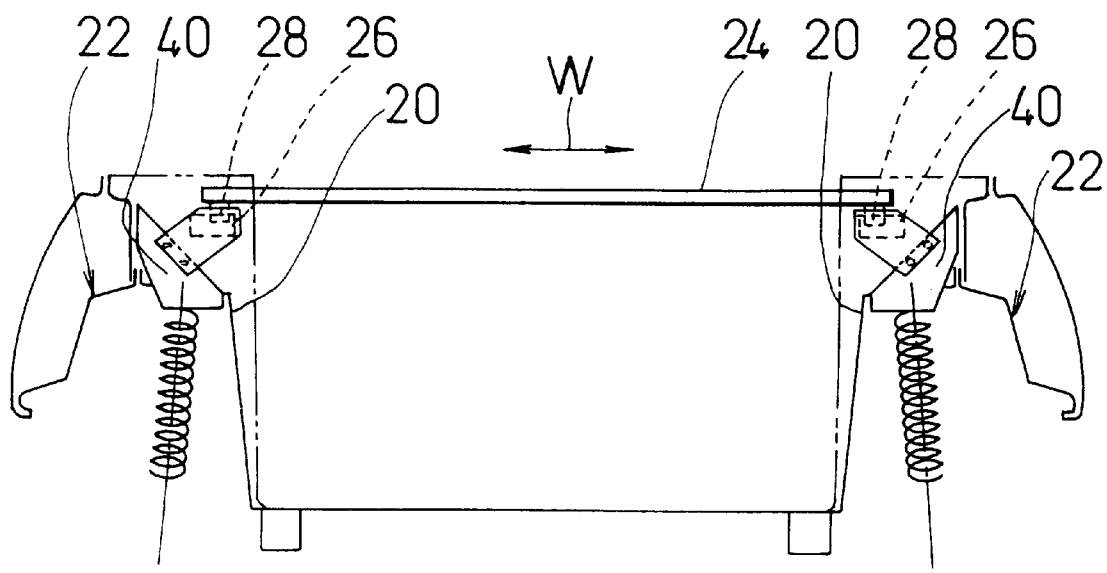
FIG. 3 is a rear elevation of an automobile to which the reinforced construction of the rear wheel housings relative to the present invention is attached.

With reference to FIG. 1 showing a perspective state of the connection member and the restraint device, FIG. 2 showing a perspective state of the connection member and the rear wheel housing and FIG. 3 showing a back state of the automobile, the reinforced construction reinforces rear wheel housings 22 in an automobile provided with the rear wheel housings 22 on the right and left sides, the rear wheel housings 22 including the suspension towers 20, and are provided with the connection member 24 and the two restraint devices 26.

The connection member 24 has an engagement portion 28 (hereinafter, merely referred to as engagement) at each of two axial end. The engagement 28 is restrained, as mentioned later, and the connection member 24 is extended between the right and left suspension towers 20. The connection member 24 is a square tube as in the illustrated embodiment. The engagement 28 is, as shown in FIG. 4(a), formed from a substantially square frame body and fixed at the connection member 24 with bolts (not shown) or fixed by welding.

The restraint device 26 is attached to each of the right and left rear wheel housings 22 to restrain the engagement 28 of the connection member 24 and has two lock levers 32, 34 swingable about a fulcrum 30. Each of the lock levers 32, 34 is, in the illustrated embodiment, disposed at a vertical interval, connected by a pin 30 in common with a bracket 38 of a base plate 36 and can swing horizontally about the pin 30 as the fulcrum. The base plate 36 is attached to a brace 40 by fastening bolts 37, the brace 40 being welded into the suspension tower 20 of the rear wheel housing 22.

The lock lever 32, 34 can release and restrain the engagement 28 of the connection member 24 and respectively have inclined surfaces 33, 35, to come into frictional contact with the engagement 28 when they swing to restrain the engagement 28. The two inclined surfaces 33, 35 are inclined such that, when the amount of swinging directed toward the engagement 28 of the two lock levers increases, that is, as shown in FIG. 4(b), when the extent of swinging of the lock levers 32, 34 in the direction A increases, the frictional force against the engagement 28 gradually increases, and the inclined directions in the widthwise direction are opposite to each other. As in the embodiment shown in FIGS. 4(a) and 4(b), in case the engagement 28 is a square frame body, the two inclined surfaces 33, 35 are so formed as to come into frictional contact with the engagement 28 in the inner peripheral surface of the frame body so that the inclined surface 33 may generate the force to push out the engagement 28 leftward of the widthwise direction W and that the inclined surface 35 may generate the force to push out the engagement 28 rightward of the widthwise direction W The two inclined surfaces 33, 35 are directed opposite to each other but their angles of inclination are the same. Each of the inclined surfaces 33, 35 is one surface of a claw 42 provided in the intermediate position of the lock levers 32, 34. Another surface of the claw 42, which is not in contact with the engagement 28, can be arbitrarily formed.

According to the embodiment shown in FIGS. 5(a) and 5(b), an engagement 44 of the connecting member 24 is a square plate material. In this case, inclined surfaces 47, 49, respectively, of lock levers 46, 48 are so formed as to come into frictional contact with the engagement 44 in the outer peripheral surface of the plate material so that the inclined surface 47 may generate the force to push out the engagement 44 rightward of the widthwise direction W and that the inclined surface 49 may generate the force to push out the engagement 44 leftward of the widthwise direction W By doing so, the frictional force of two inclined surfaces 47, 49 against the engagement 44 gradually increases as the amount of swinging of the two lock levers toward the engagement 44 increases and the two inclined surfaces 47, 49 are directed opposite to each other in the widthwise direction W of the car body.

According to the embodiment shown in FIG. 1, operation means 50 of the two lock levers 32, 34 includes one handle 52 swingably supported at the rear wheel housing and two extension coil springs 54, 56 for connecting the handle 52 and each of the two lock levers 32, 34.

The handle 52 is welded into a connection portion 60 of a lever member 58. The lever member 58 includes a pair of pivot portions 59 and the connection 60 for combining the pivot portions 59, and has a one-side open rectangular shape in vertical cross-section. The lever member 58 with its open side overlapping that of a bracket 62 having a one-side open rectangular shape in vertical cross-section is swingably connected to the bracket 62 with its pivot portions 59 fixed at the bracket 62 with rivets 70. On the other hand, the bracket 62 has a base portion 63 apart from the opening, as fully shown in FIG. 6, and is mounted on the base plate 36 by welding the base portion 63 into the base plate 36. The bracket 62 can be integrally formed with the base plate 36 by bending the base plate 36. The base plate 36 and the base portion 63 have a hole 64 larger than the hole 29 in the engagement 28. As mentioned later, therefore, the inclined surfaces 33, 35 of the lock levers 32, 34 can come into contact with the engagement 28 without interference with the base plate 36 and the bracket 62.

According to the illustrated embodiment, the lock levers 32, 34 have hooking portions 66, 67 with an L-like planar shape, respectively, ahead of the claws 42, and each hooking portion has an engaging hole 68. The extension coil spring 54 is extended between the connection portion 60 of the lever member 58 and the engaging hole 68 of the hooking portion 66 of the lock lever 32, while the coil spring 56 is extended between the connection portion 60 of the lever member 58 and the engaging hole 68 of the hooking portion 67 of the lock lever 34.

Figure 8A:
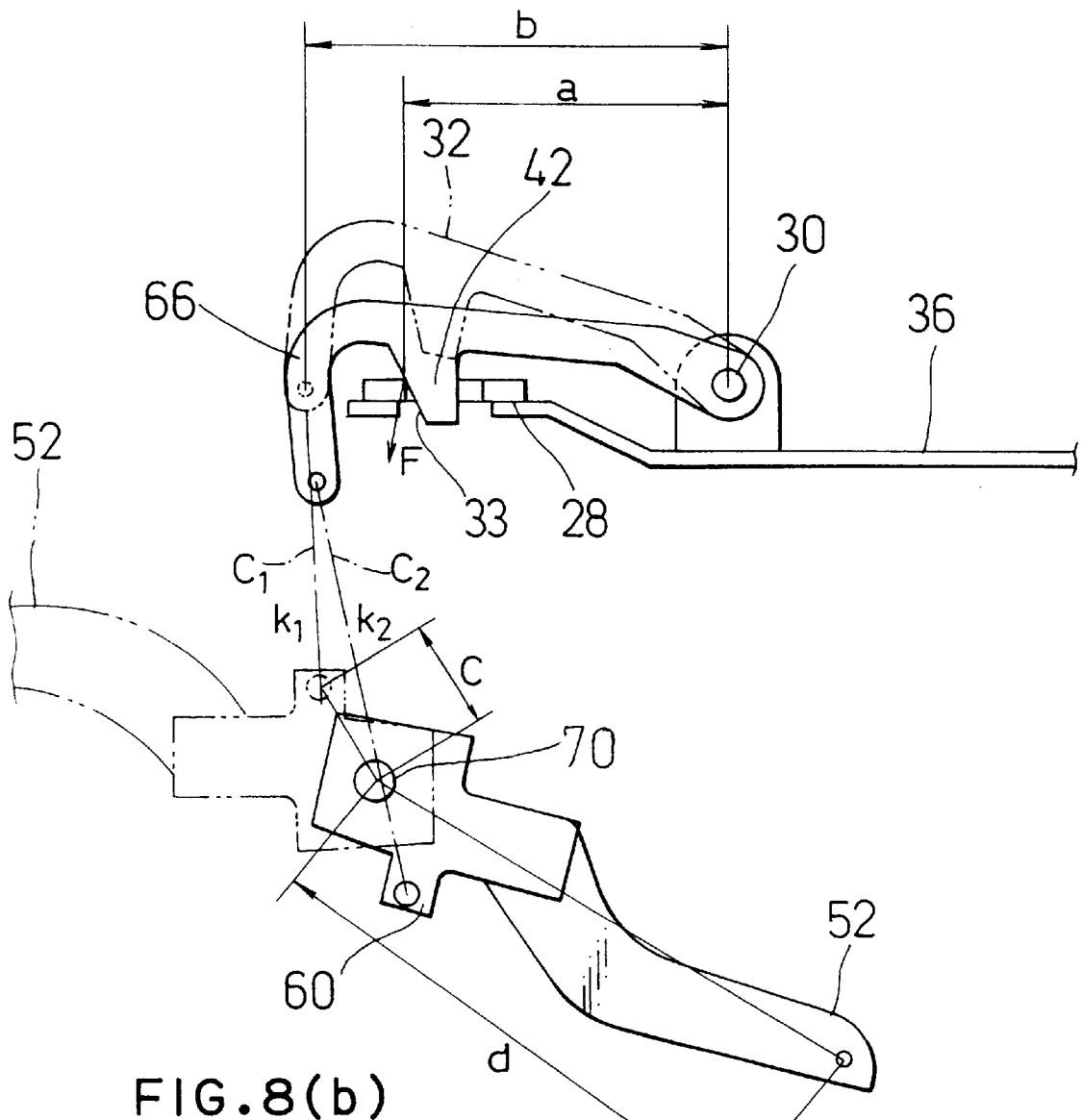
FIG. 8(a) is a plan view similar to FIG. 6, schematically illustrating an action of the restraint device relative to the present invention.
Figure 8B:
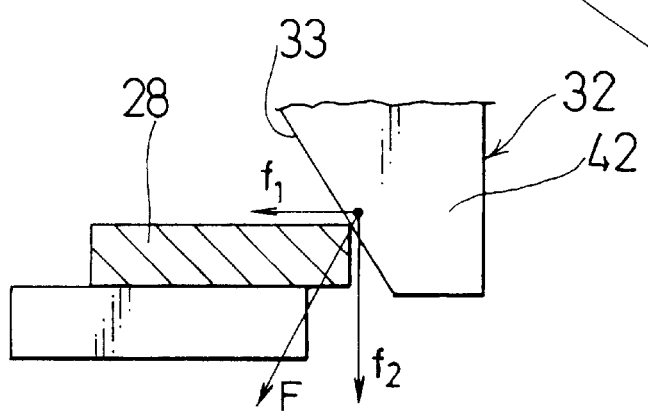
FIG. 8(b) is an enlarged view of an action point of force.

The connection portion 60 of the lever member 58 and the hooking portions 66, 67 of the lock levers 32, 34 are dimensioned such that, as shown by an imaginary line in FIG. 8, the axis C1 of the coil spring when the handle 52 is at the releasing position so as to release the lock lever 32 (the same applies to the lock lever 34) from the engagement 28 comes to one side of the fulcrum 70 of the handle 52, i.e., left side in the illustrated example, and the axis C2 of the coil spring when the inclined surface 33 of the lock lever 32 restrains the engagement 28 in a sufficient engaged state with the engagement 28 comes to the other side of the fulcrum 70, i.e., right side in the illustrated example. In this dimensional relation, when the handle 52 is at the locking position shown by a solid line, the coil spring subjected to tensile force can be prevented from returning the handle 52 from the locking position to the releasing position, due to a turnover phenomenon without providing a particular stopper. Further, the tensile force of the coil spring acts on the lock lever 32 and the handle 52 to make them approach each other, so that the inclined surface 33 of the lock lever 32 can be sufficiently brought into frictional contact with the engagement 28.

According to the embodiment shown in FIG. 3, the restraint devices 26 mounted on the right and left rear wheel housings 22 have such a shape as those substantially of the same structure disposed symmetrically relative to a perpendicular plane including the center line in the forward and backward direction of the vehicle body. In place of this, it is possible to make one of the restraint devices 26 have the aforementioned structure and to use another restraint device as means to restrain the other engagement of the connection member. Such restraint devices are of a mode to swing one lock lever with one handle. In this case, two inclined surfaces directed opposite provided at the claw of one lock lever are brought into frictional contact with the engagement. Further, for means to restrain the other of the engagements as shown in a phantom line in FIG. 4(b), a plate material 80 projecting from the base plate 36 in a trapezoidal shape can be adopted. The two inclined surfaces 81, 82 of the plate material 80 are shaped like a fan from a free end 83 toward the base plate 36. Also, according to the embodiment, the two lock levers are simultaneously operated by one handle and the two extension coil springs connecting the handle with each of the two lock levers. In place thereof, it is possible to connect two motors respectively with the lock levers and operate the two lock levers simultaneously.

When the rear wheel housings 22 having the suspension towers 20 are to be reinforced, the connection member 24 is extended between the right and left suspension towers 20. The hole 29 of one of the engagements 28 is made to oppose the respective inclined surfaces 33, 35 of the two lock levers 32, 34 of one of the restraint devices 26 to rotate the handle 52, and the two independent coil springs 54, 56 independently exert spring force on the inclined surfaces 33, 35. As a result, the two inclined surfaces enter the hole 29 of the engagement 28 to be brought into frictional contact with the hole surfaces.

Figure 6:
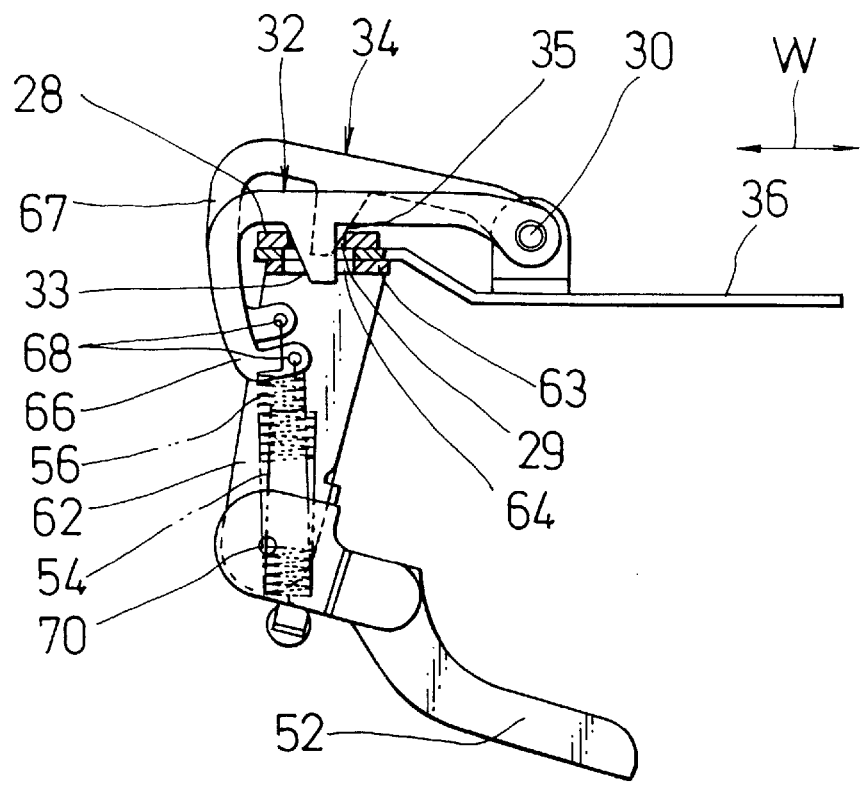
FIG. 6 is a plan view as viewed in the direction of the line 6—6 of FIG. 1, showing an embodiment of the restraint device relative to the present invention, in which a part is shown in section.
Figure 7:
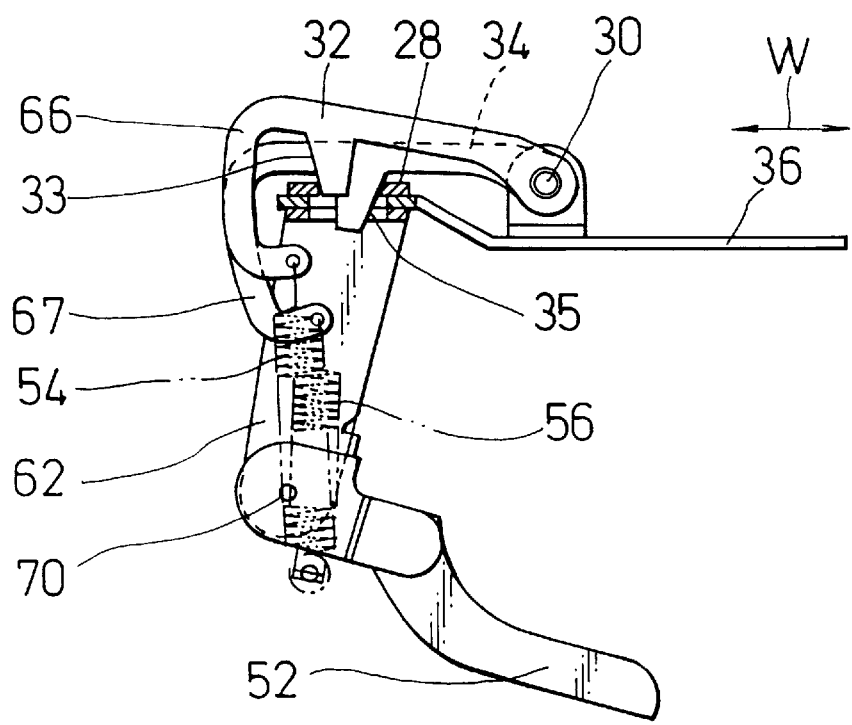
FIG. 7 is a plan view similar to FIG. 6, showing an embodiment of the restraint device relative to the present invention, in which a part is shown in section.

When the engagement 28 is in its neutral position, the two inclined surfaces 33, 35 are positioned at the center of the hole 29 with the same attitude relative to the engagement 28 of the two inclined surfaces 33, 35. As shown in FIG. 6, when the engagement is biased leftward in the widthwise direction W of the car body, the lock lever 32 having the inclined surface 33 swings more than the lock lever 34 having the inclined surface 35, and the length of the inclined surface 33 entering the hole 29 of the engagement 28 is greater than the length of the inclined surface 35 entering the hole 29 of the engagement 28. On the contrary, as shown in FIG. 7, when the engagement 28 is biased rightward in the widthwise direction W of the vehicle body, the lock lever 34 having the inclined surface 35 swings more than the lock lever 32 having the inclined surface 33, and the length of the inclined surface 35 entering the hole 29 of the engagement 28 is greater than the length of the inclined surface 33 entering the hole 29 of the engagement 28. When the inclined surfaces 33, 35 are brought into contact with the engagements 28, force directed toward both axial ends is exerted on the connection member 24.

After the hole 29 of one engagement 28 is restrained by one restraint device 26, the other engagement is likewise restrained by the other restraint device, thereby completing the reinforcement of the rear wheel housings 22. In this state, there is no rattling by which the connection member 24 can be displaced relative to the rear wheel housings 22, and the load having entered one rear wheel housing 22 is transmitted to the other rear wheel housing 22 through the connection member 24 to be shared by both rear wheel housings 22.

As in the foregoing embodiment, in case the load exerted on the inclined surfaces of the lock levers is transmitted by the force rotating the handle, the load exerted on the inclined surfaces should be great as regards performance, while the load operating the handle should be small as regards feeling. For this purpose, as shown in FIG. 8, on the side of the lock lever 32 (the same for the lock lever 34), the rotation moment of the fulcrum 30 is utilized to make an input to the hooking portion 66 small, while on the side of the handle 52 an input to the connection member 60 is made greater. Since the load applied from the inclined surface 33 to the engagement 28 is determined by the difference between the spring constants ($k_2-k_1$), the restraint force of the restraint device can be adjusted by changing the spring constants and, further, by changing the dimensions of a, b, c and d in the drawing.

As in the embodiment shown, in case the lock levers 32, 34 swing within a horizontal plane and the respective inclined surfaces are brought into contact with the engagement, since force F, e.g., applied from the inclined surface 33 to the engagement 28 is separated into force $f_1$ in the widthwise direction of the car body and force $f_2$ in the forward and backward direction of the car body, the magnitude of the load exerted from the lock lever 32 in the widthwise direction and the forward and backward direction of the car body can be adjusted by changing the angle of inclination of the inclined surface 33.

Figure 9A:
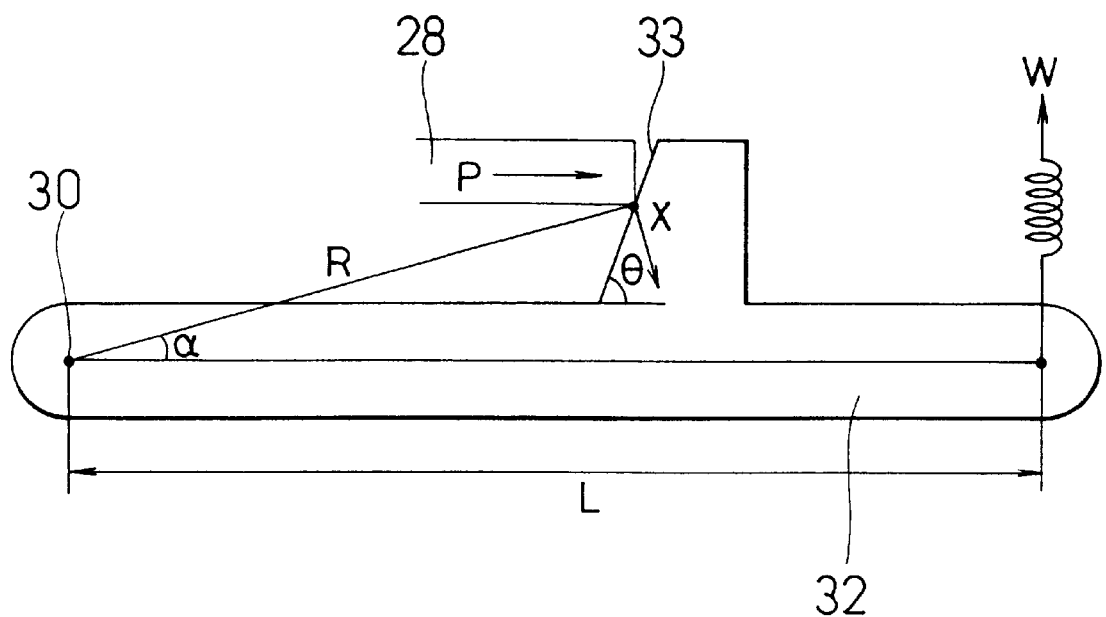
FIG. 9(a) is a schematic diagram showing the lock lever and the engagement portion in their entirety, theoretically explaining an action of the restraint device relative to the present invention.
Figure 9B:
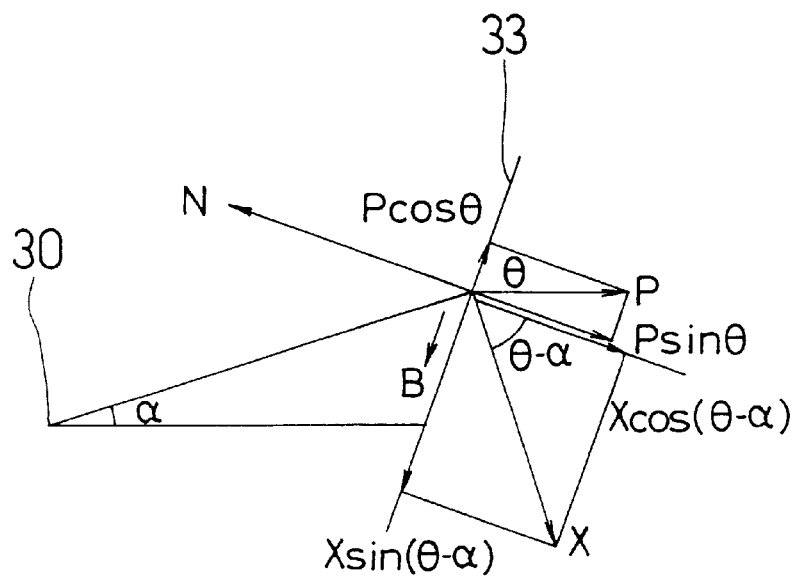
FIG. 9(b) is a schematic diagram showing the distribution of the force in the inclined surface of the lock lever.

As shown in FIGS. 9(a) and 9(b), suppose the spring force W is applied to the lock lever 32 (the same in case of the lock lever 34), the force illustrated is applied among the engagement 28, the inclined surface 33 and the fulcrum 30, and there exist illustrated distance and angle, and the vertical force of the inclined surface 33 is N. Then, according to the equation $$XR=WL$$

$$\therefore X=LW/R,$$

since the maximum static friction force B of the inclined surface 33 equals to force $X \cos(\theta-\alpha)$ by which an article presses the inclined surface multiplied by a coefficient $\mu$ of static friction, $$B=\mu X \cos(\theta-\alpha).$$

Therefore, from the balance of the force along the inclined surface 33, $$P \cos \theta - X \sin(\theta-\alpha) - \mu X \cos(\theta-\alpha) = 0 \qquad (1)$$

Also, from the balance of the force perpendicular to the inclined surface, $$N - P \sin \theta - X \cos(\theta-\alpha) = 0 \qquad (2)$$

From equation (1)

$$P = X \{\sin(\theta-\alpha) + \mu \cos(\theta-\alpha)\} / \cos \theta \qquad (3)$$

From (3), it is understood to be effective to make X great, $\theta$ great, $\alpha$ small, and $\mu$ great in order to make P great.

Figure 10:
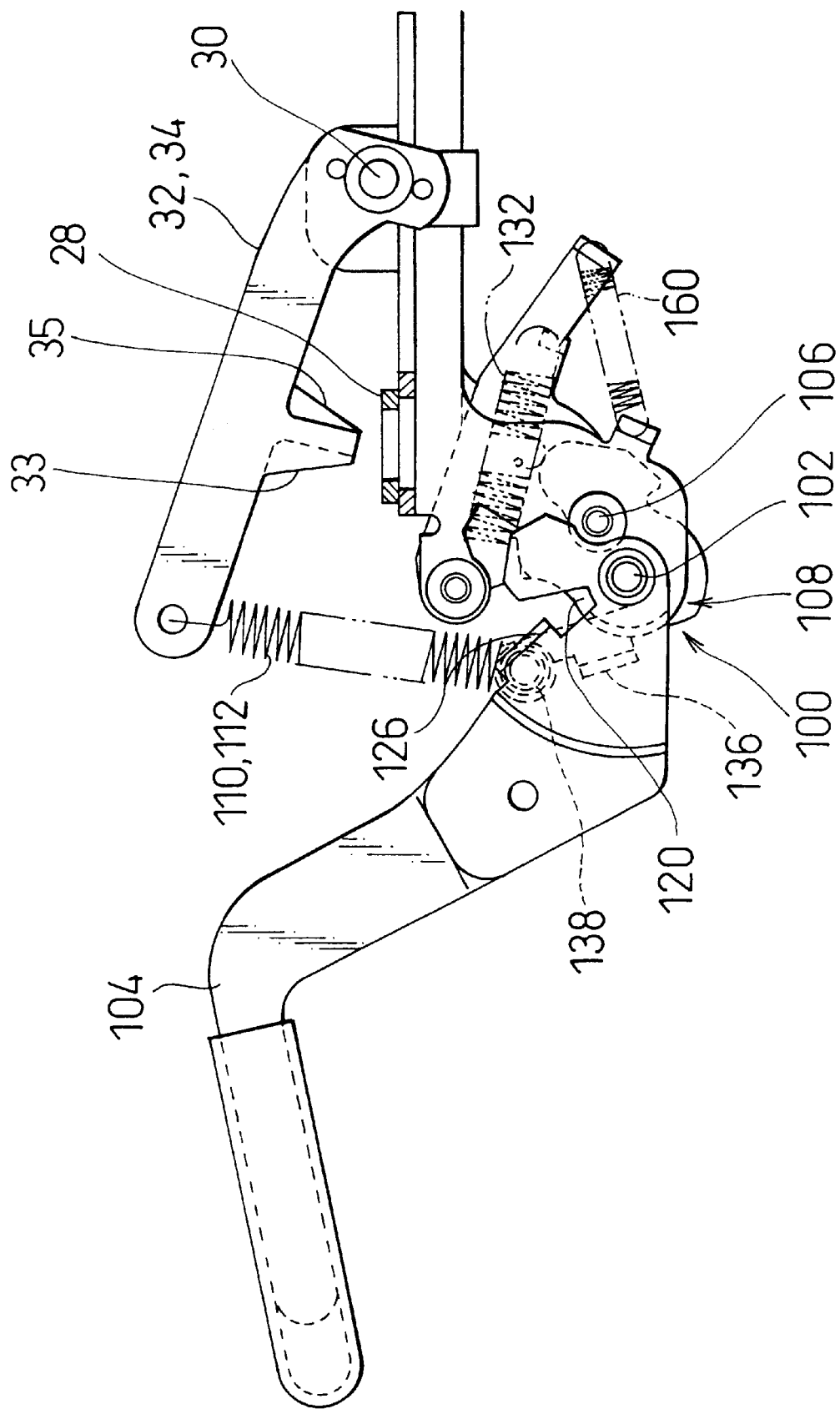
FIG. 10 is a plan view showing another embodiment of the restraint device relative to the present invention, with the handle located at a releasing position.
Figure 11:
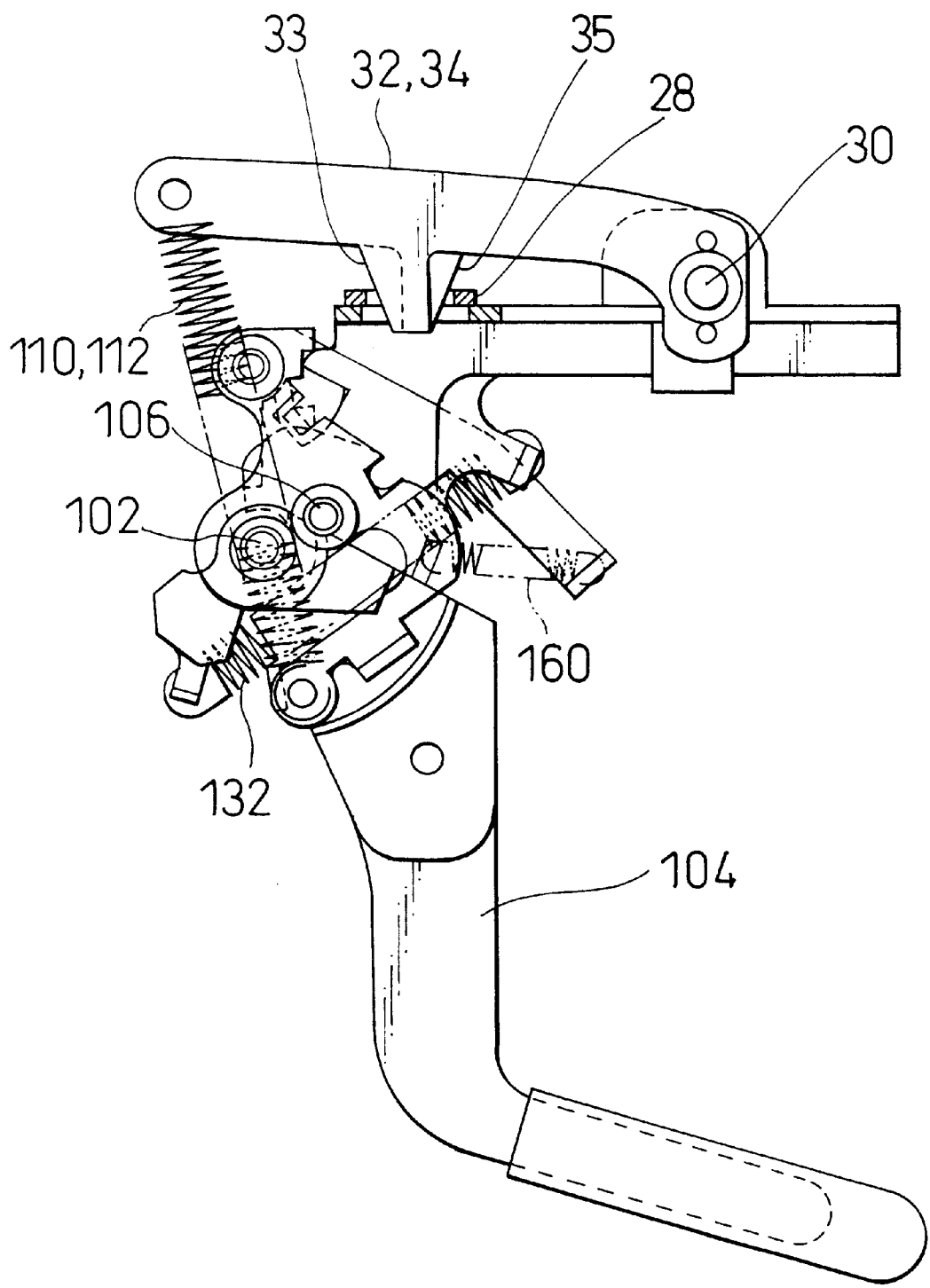
FIG. 11 is a plan view of another embodiment of the restraint device relative to the present invention, with the handle located at a locking position.
Figure 12:
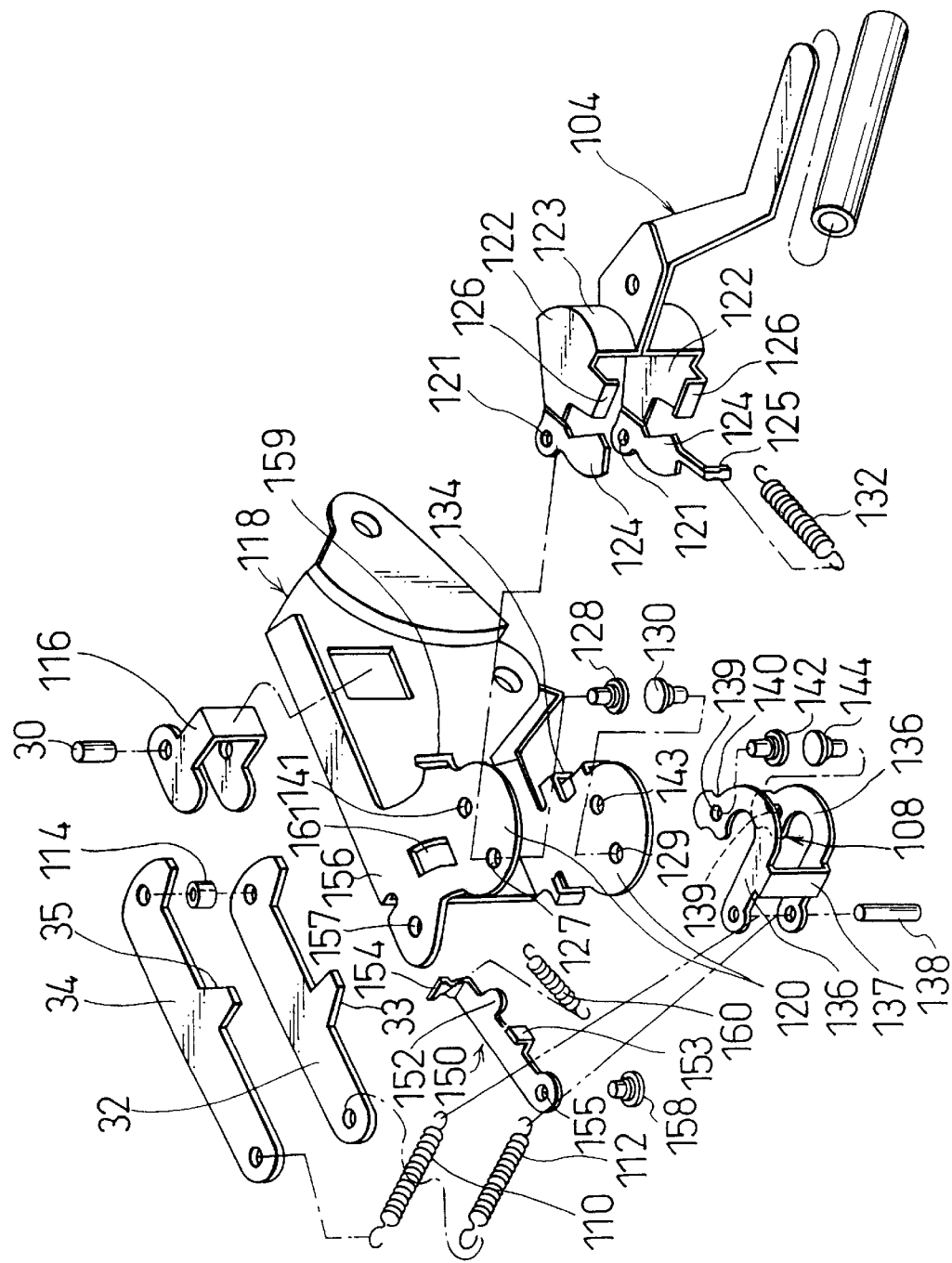
FIG. 12 is an exploded perspective view of another embodiment of the restraint device relative to the present invention.
Figure 13:
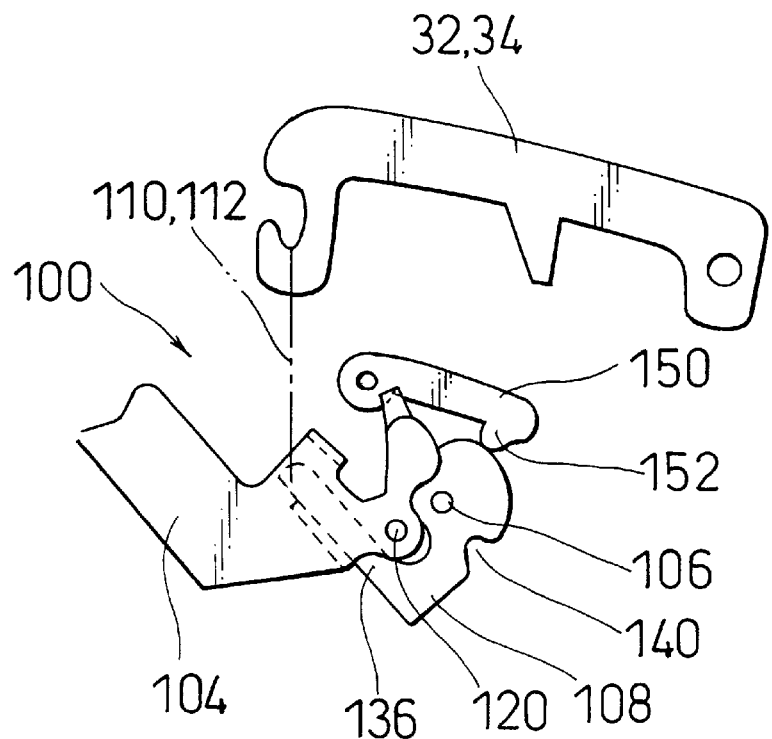
FIG. 13 is a plan view of the major part showing an action of the restraint device shown in FIGS. 10–12.
Figure 14:
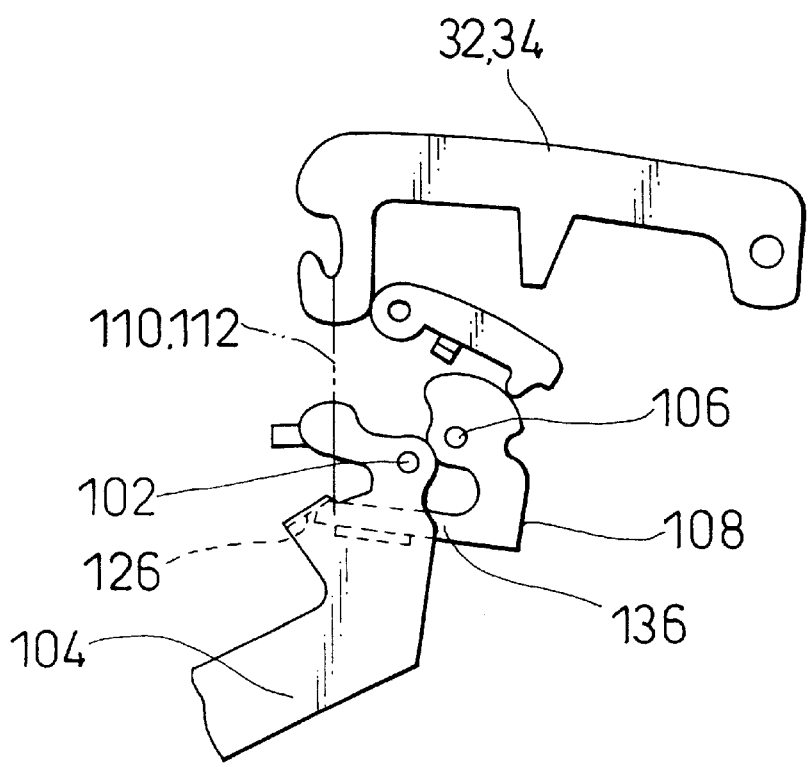
FIG. 14 is a plan view of the major part showing an action of the restraint device shown in FIGS. 10–12.
Figure 15:
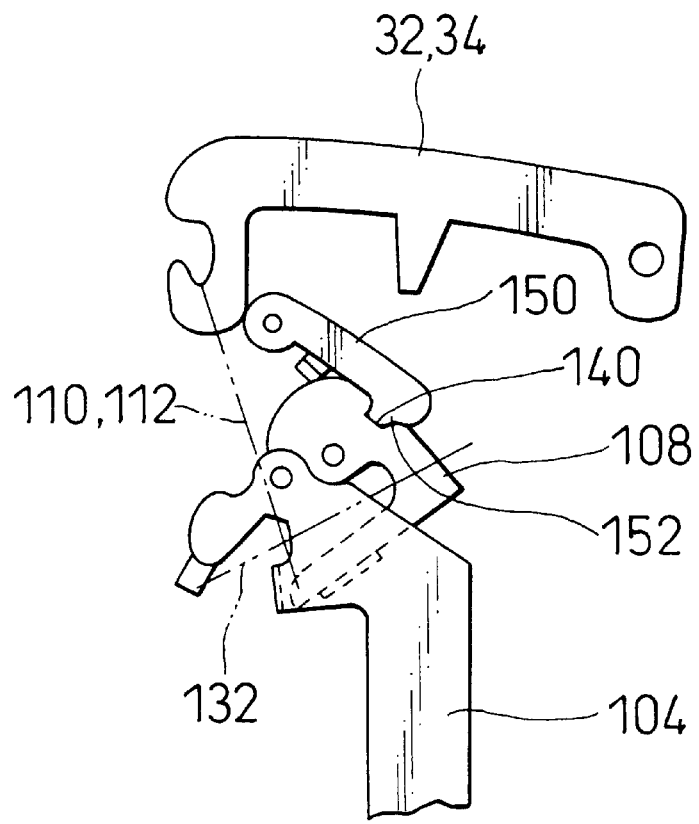
FIG. 15 is a plan view of the major part showing an action of the restraint device shown in FIGS. 10–12.
Figure 16:
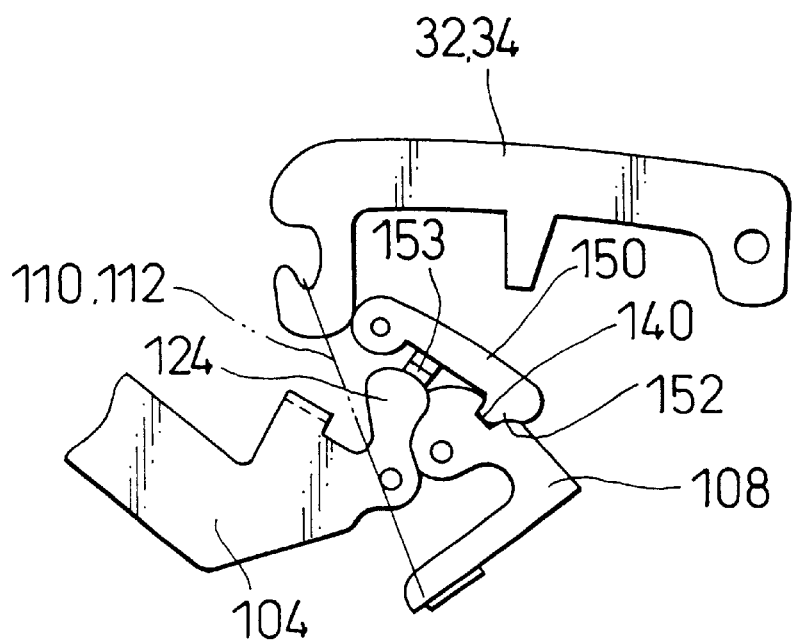
FIG. 16 is a plan view of the major part showing an action of the restraint device shown in FIGS. 10–12.

The restraint device shown in FIGS. 10 to 12 is the same as the foregoing embodiment in that the lock lever 32 has the inclined surface 33, the lock lever 34 has the inclined surface 35, and that these inclined surfaces 33, 35 are brought into contact with the engagement 28. In this restraint device, operation means 100 of the two lock levers 32, 34 is provided with one handle 104 supported at the rear wheel housing so as to swing about a fulcrum 102, one auxiliary handle 108 supported on the rear wheel housing so as to swing about a fulcrum 106 located between the fulcrum 102 of the handle 104 and the fulcrum 30 of the lock levers 32, 34, and two extension coil springs 110, 112 connecting respectively the auxiliary handle 108 and the two lock levers 32, 34. When the handle 104 swings so as to swing the two lock levers 32, 34 toward the engagement 28 of the connection member, the auxiliary handle 108 is swung by the handle 104.

The two lock levers 32, 34 are arranged vertically through a spacer 114 and swingably supported on a bracket 116 by the pin 30. The bracket 116 is fixed at a base 118 attached to the suspension tower. The base 118 has vertically spaced supporting portions 120.

The handle 104 includes a pair of vertically spaced pivot portions 122, and a connection portion 123 connecting these pivot portions 122. The space between the upper and lower pivot portions 122 is formed so as to interpose the supporting portions 120 of the base 118. In other words, the pivot portions are dimensioned such that the upper pivot portion 122 comes above the supporting portion 120, while the lower pivot portion 122 comes below the lower supporting portion 120. A hole 121 is made at an end of the pivot portion 122 opposite to the connection portion 123, and an unlocking portion 124 having a substantially circular arc-shaped peripheral surface extends laterally of the hole 121. From a lower unlocking portion 124 a spring bearing 125 is projected downward. An L-shaped operating portion 126 is provided at the part of each pivot portion 122 located between the unlocking portion 124 and the connection portion 123. The upper operating portion 126 is projected downward, while the lower operating portion 126 is projected upward. The handle 104 interposes the support portion 120 of the base 118 between the upper and lower pivot portion 122 and is swingably supported on the base 118 with rivet 128 riveted into the hole 127 of the upper supporting portion 120 and the hole 121 of the pivot 122 as well as with rivet 130 riveted into the hole 129 of the lower supporting portion 120 and the hole 121 of the lower pivot portion 122. The rivets 128, 130 serve as a fulcrum 102 of the handle 104. After mounting the handle 104 on the base 118, a coil spring 132 is extended between the spring bearing 125 of the pivot portion 122 under the handle and the spring bearing 134 projected downward from the supporting portion 120 under the base. The coil spring 132 is of a so-called turnover type which, as shown in FIG. 10, maintains the handle 104 with the lock levers 32, 34 releasing the engaging portion 28 or, as shown in FIG. 11, maintains the handle 104 with the lock levers 32, 34 restraining the engaging portion 28.

The auxiliary handle 108 includes a pair of spaced operation lever portions 136 and a connection portion 137 connecting them. The operation lever portions 136 are J-shaped in plane with a pin 138 inserted into their long side. A hole 139 as a fulcrum is opened in the short side of each operation lever portion 136, and a recess 140 is provided at the periphery of the hole 139. The space between the upper and lower operation lever portions 136 of the auxiliary handle 108 is formed so as to be interposed between the upper and lower supporting portions 120 of the base 118. Namely, it is dimensioned such that the upper operation lever portion 136 comes under the upper supporting portion 120 while the lower operation lever portion 136 comes above the lower supporting portion 120. The auxiliary handle 108 is swingably supported on the base 118 such that its upper and lower operation lever portions 136 are interposed between the supporting portions 120 of the base 118, with a rivet 142 riveted into the hole 139s and 141 respectively of the upper operation lever portion 136 and the upper supporting portion 120 and with a rivet 144 riveted into the holes 139 and 143 respectively of the lower operation lever portion 136 and the lower supporting portion 120. The rivets 142, 144 serve as the fulcrum 106 of the auxiliary handle 108. Coil springs 110, 112 are extended between the pin 138 of the auxiliary handle 108 and the two lock levers 32, 34. With the auxiliary handle 108 mounted on the base 118, the long side of the operation lever portion 136 is, as shown in FIG. 10, projected outward in a plan view from the supporting portion 120 of the base, and the operation portion 126 of the handle 104 can contact the end of the operation lever portion 136 in the vicinity of the pin 138.

In the illustrated embodiment, the restraint device includes a lock holding lever 150. The lock holding lever 150 has a locking portion 152 fit into the recess 140 of the auxiliary handle 108, an actuating portion 153 projected sideward and upward for pushing the locking portion 152 out of the recess 140, and a spring bearing portion 154 projected upward. The lock holding lever 150 is swingably supported on the base 118 by riveting a rivet 158 into a hole 155 in the end thereof and a hole 157 in a second supporting portion 156 above the upper supporting portion 120 of the base 118. After the lock holding lever 150 is mounted on the base 118, a coil spring 160 is extended between the spring bearing portion 154 and a spring bearing portion 159 projected upward from the upper supporting portion 120 of the base. Consequently, the lock holding lever 150 is pulled toward the spring bearing 159, and the actuating portion 153 projects from an opening 161 opened in a transitional zone of the supporting portion 120 and the second supporting portion 156, to be capable of being brought into contact with the outer periphery of the unlocking portion 124.

An action of respective inclined surfaces 33, 35 of the lock levers 32, 34 with the engagement 28 of the embodiment in FIGS. 10–12 is the same as in the aforementioned embodiment, so we omit describing the action. Next, an action of the lock lever operation means 100 is explained with reference to FIGS. 13–16.

When the handle 104 is rotated toward the releasing side to bring the lock levers 32, 34 to the releasing position (FIG. 13), the auxiliary handle 108 is released from the spring force of the coil springs 110, 112, and the locking portion 152 of the lock holding lever 150 is positioned to be away from the recess 140 of the auxiliary handle 108. When the handle 104 is rotated toward the restraining side to restrain by means of handles 32, 34, the operation portion 126 of the handle 104 abuts against the front end of the long side of the operation lever portion 136 of the auxiliary handle 108 (FIG. 14), and the auxiliary handle 108 rotates together with the handle 104. As a result, the coil springs 110, 112 are to be subjected to a rotation moment about the fulcrum 106 of the auxiliary handle 108. When the handle 104 is further rotated toward the restraining side, sufficient tensile force is applied to the coil springs 110, 112, so that the inclined surfaces of the lock levers 32, 34 are brought into a frictional contact with the engagement. Further, when the locking portion 152 of the lock holding lever 150 fits into the recess 140 of the auxiliary handle 108 (FIG. 15), the auxiliary handle 108 is held at the position. On the other hand, the handle 104 receives tensile force of the coil spring 132 to be held at a position on the restraining side.

In order to release the restraint by the lock levers 32, 34, the handle 104 is rotated toward the releasing side. When the handle 104 is rotated from the position in FIG. 15 to the position in FIG. 16, that is to say, when the intermediate portion of the outer peripheral surface of the lock releasing portion 124 of the handle 104 is rotated to a position to come into contact with the actuating portion 153 of the lock holding lever 150, the auxiliary handle 108 and the lock holding lever 150 are maintained in the state of FIG. 15. When the handle 104 is further rotated toward the releasing side to push the actuating portion 153 outward by the outer peripheral surface of the lock releasing portion 124, the locking portion 152 comes off the recess 140 of the auxiliary handle 108. As a result, the auxiliary handle 108 is rotated toward the position in FIG. 13 by the tensile force of the coil springs 110, 112, but is not rotated to the position in FIG. 13 where the lock levers 32, 34 come to a position sufficient to be released. This is because the coil springs 110, 112 are in a state of having a free length and do not exerts the tensile force. Therefore, after the auxiliary handle 108 has rotated to a certain position, the auxiliary handle is rotated toward the releasing side with the head portion of the rivet at the fulcrum 102 of the handle 104 abutted against the operation lever portion 136 of the auxiliary handle 108. Due to the rotation toward the releasing side of the auxiliary handle 108, the lock levers 32, 34 are pushed back by the coil springs 110, 112 to come to the releasing position.

In the embodiment detailed in FIG. 12, the lock holding lever (150) is provided, thereby holding the auxiliary handle 108 in a locked state. In place thereof, in order to reduce the operation force without using the lock holding lever, each portion may be dimensioned to turn over so that in the locked state in FIG. 11 the axes of the coil springs 110, 112 may come to the right side of the fulcrum 106 in the drawing.

Figure 17A:
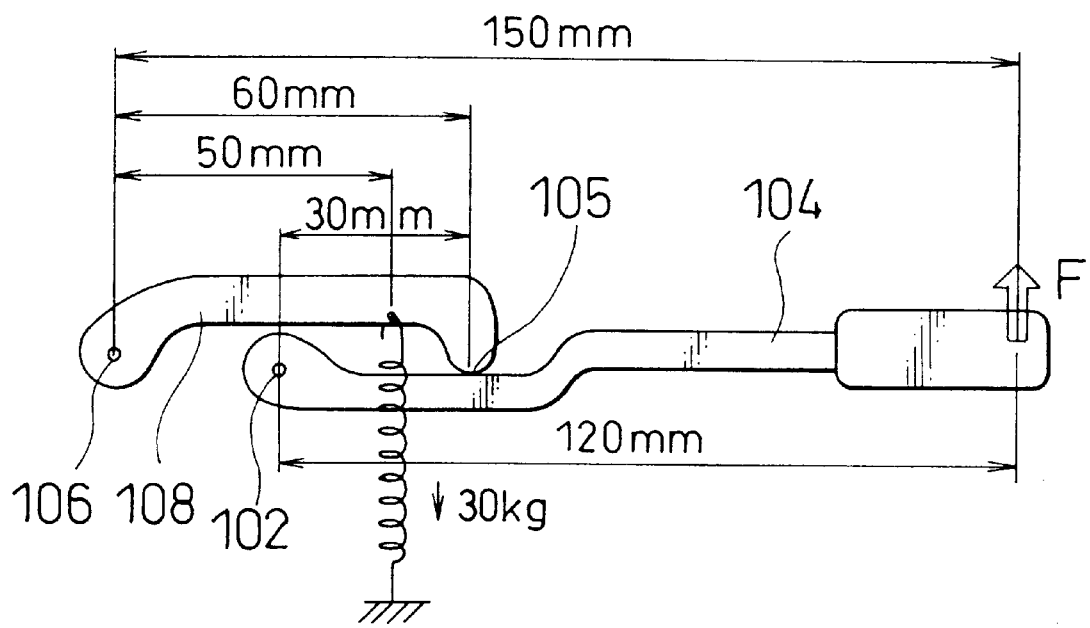
FIG. 17(a) is a schematic diagram explaining an effect of the embodiment shown in FIGS. 10–12.
Figure 17B:
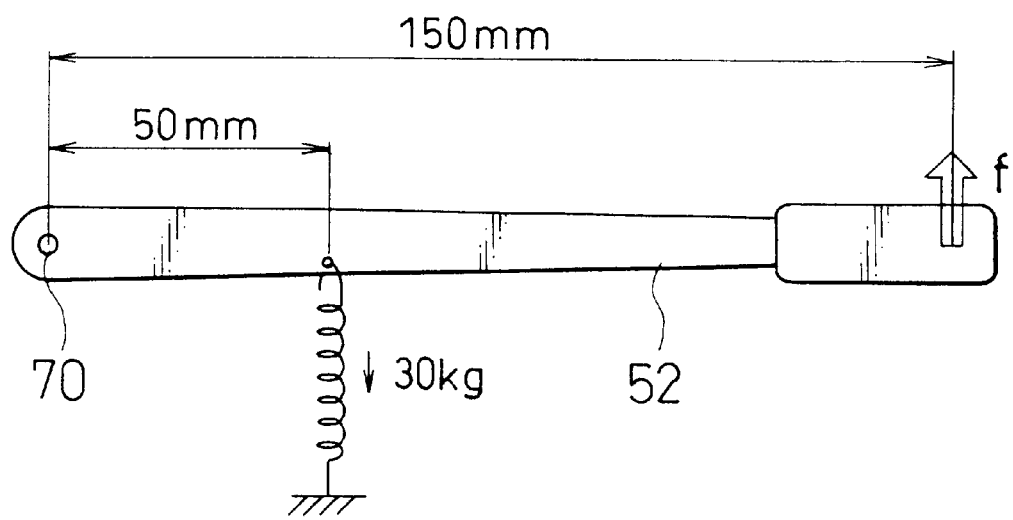
FIG. 17(b) is a schematic diagram explaining an effect of the embodiment shown in FIGS. 1–9.
Figure 18:
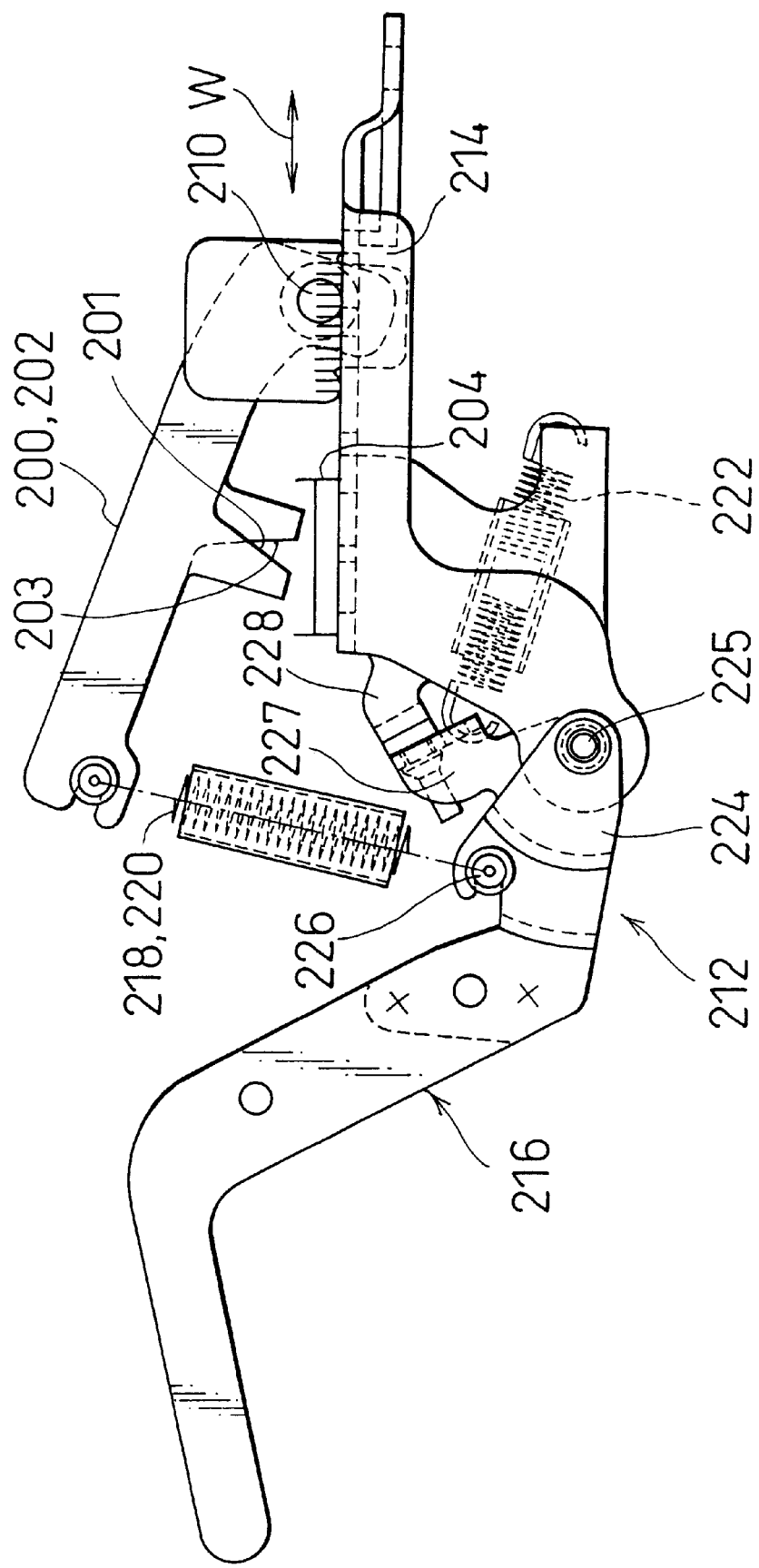
FIG. 18 is a plan view of still another embodiment of the restraint device relative to the present invention, with the handle located at the releasing position.

In the embodiments shown in FIGS. 10–16, when the handle 104 is rotated, the handle 104 rotates about the fulcrum 102, and together with the rotation the auxiliary handle 108 rotates about the fulcrum 106 to apply the rotation moment about the fulcrum 106 to the coil springs 110, 112. Due to this, the operation force of the handle 104 can be reduced. This will be explained with reference to FIG. 17 in which specific numerical values are entered. The distance between the contact point 105 of the handle 104 and the auxiliary handle 108 and the fulcrum 102 and the distance between the contact point 105 and the fulcrum 106 are taken as indicated in FIG. 17(*a*), and the distance from the fulcrum 70 of the handle 52 without any auxiliary handle in the embodiment in FIG. 1 is taken as indicated in FIG. 17(*b*). Suppose a load (coil spring force) of 30 kg is applied to the point 50 mm away from the fulcrums 106, 70. The torque T that the coil spring gives to the auxiliary handle 108 is T=30×50=1500 kgflnm, and in order that the handle 104 rotates the auxiliary handle 108, it is necessary to push the auxiliary handle 108 with the force of 1500/60=25 kg at the contact point 105. Consequently, the operating force F of the handle 104 is F=25×30/120=6.25 kg. On the other hand, for those without any auxiliary handle, the operation force f of the handle 52 is f=30×50/150=10 kg, so that the operation force of the handle 52 can be reduced by f−F=3.75 kg.

Another embodiment for reducing the operation force of the handle will be explained in the following with reference to FIGS. 18–22. This embodiment is substantially the same as the foregoing embodiment in that two swingable lock levers 200, 202 are provided; the lock lever 200 has an inclined surface 201, while the lock lever 202 has an inclined surface 203; the two inclined surfaces 201, 203 are formed such that, when the swinging amount of the lock levers in the direction to restrain an engagement of a bracket 204 connected to a connection member increases, the friction against the engagement gradually increases, and that the inclination directions in the widthwise direction W of a car body become opposite to each other.

Figure 19:
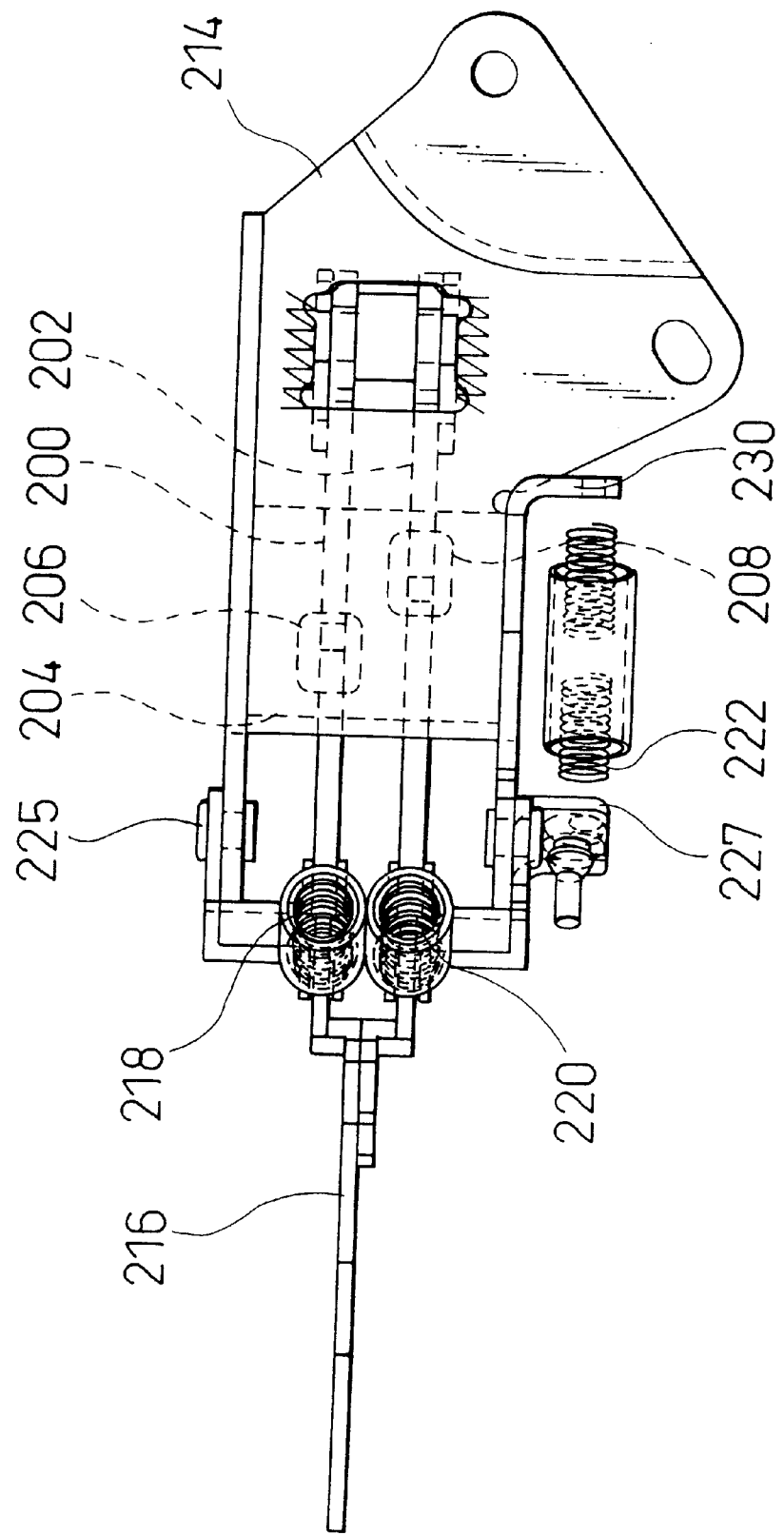
FIG. 19 is a front elevation of FIG. 18.
Figure 20:
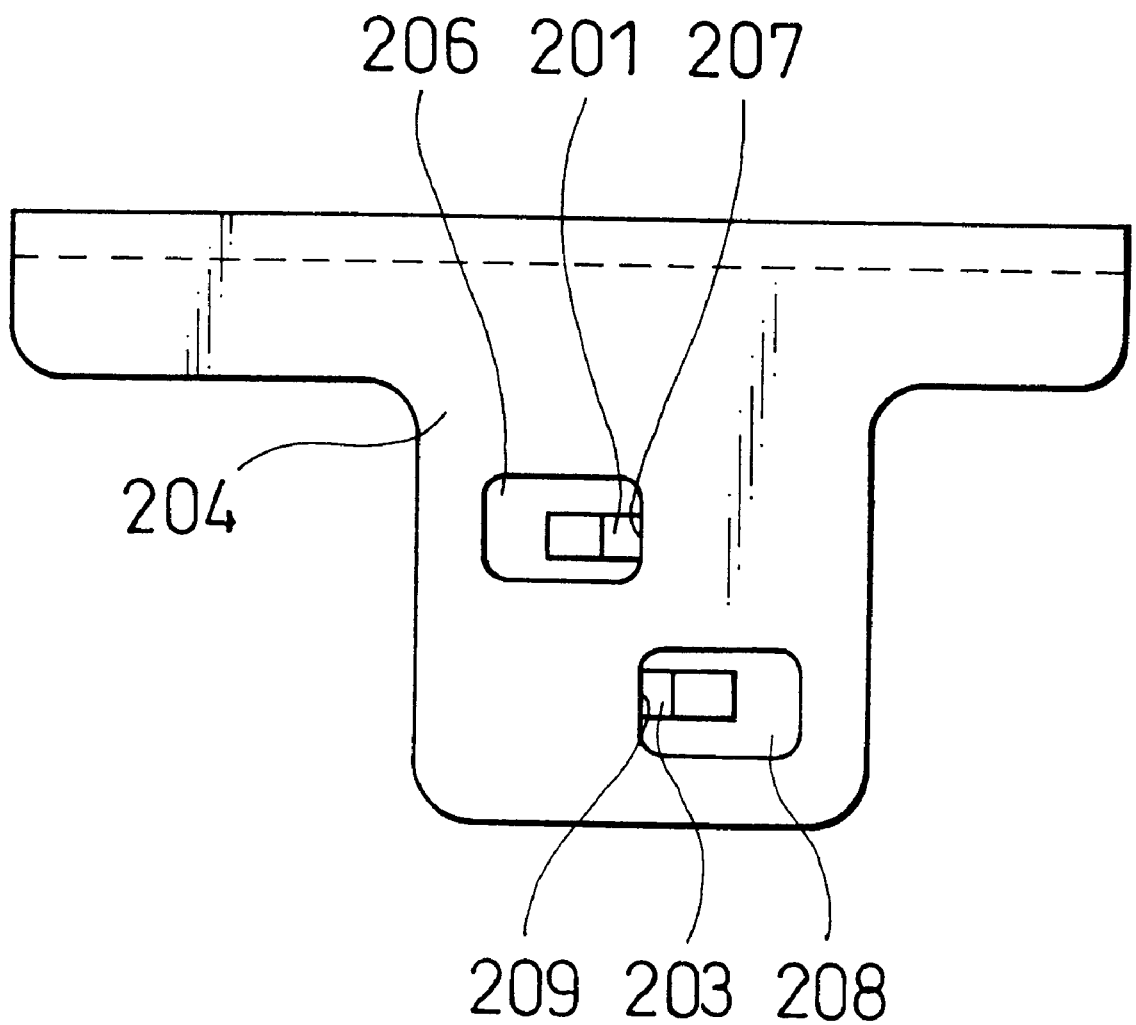
FIG. 20 is a front elevation showing the engagement portion to be restrained by the restraint device shown in FIG. 18.

As shown in FIGS. 19 and 20, two holes 206, 208 are made as engagement in the bracket 204 connected to the connection member. The right end 207 of the hole 206 and the left end 209 of the hole 208 are coincident in position, and from this position the hole 206 and the hole 208 extend respectively leftward and rightward by a predetermined length. The inclined surface 201 of the lock lever 200 is in frictional contact with the right end 207 of the hole 206, while the inclined surface 203 of the lock lever 202 is in frictional contact with the left end 209 of the hole 208. According to this embodiment, the contact points of the two inclined surfaces 201, 203 with the engagement are coincident, and the two lock levers 200, 202 are supported by a common fulcrum 210, so that loads to be applied to the coil springs pulling the lock levers 200, 202 can be held substantially the same, thereby facilitating the operation.

The operation means 212 for the two lock levers 200, 202 includes a handle 216 swingably supported at the rear wheel housing by a base 214, two extension coil springs 218, 220 connecting to the handle 216 and the two lock levers 200, 202, respectively, and an extension coil spring 222 serving to reduce the operation force when the handle 216 swings to a predetemined position by applying the operation force to the handle 216.

The handle 216 has a pivot portion 224 having a one-side open rectangular cross section, and the pivot portion 224 is swingably supported at the base 214 by rivets 225. A pin 226 is fixed at an interval from the rivets 225 toward the front end of the handle 216, and two coil springs 218, 220 are extended between the pins 226 and the lock levers 200, 202. A contact portion 227 is provided at the lower side of the pivot portion 224, and this contact portion 227 abuts against a stopper 228 provided at the base 214 to hold the handle 216 at the position of the releasing side in FIG. 18.

The coil spring 222 is stretched between the contact portion 227 of the pivot portion of the handle 216 and a spring bearing 230 of the base 214. The coil spring 222 acts to make the contact portion 227 abut against the stopper 228 by rotating the handle 216 clockwise in the releasing position of the lock levers 200, 202 shown in FIG. 18, while it acts to rotate the handle 216 counterclockwise in the restraining position of the lock levers 200, 202 shown in FIG. 22. Namely, making the neutral position in FIG. 21 a boundary, the coil spring 222 moves from one side (FIG. 18) of the rivets 225 as the fulcrum of the handle 216 to the other side of the rivets 225 to turn over.

Figure 21:
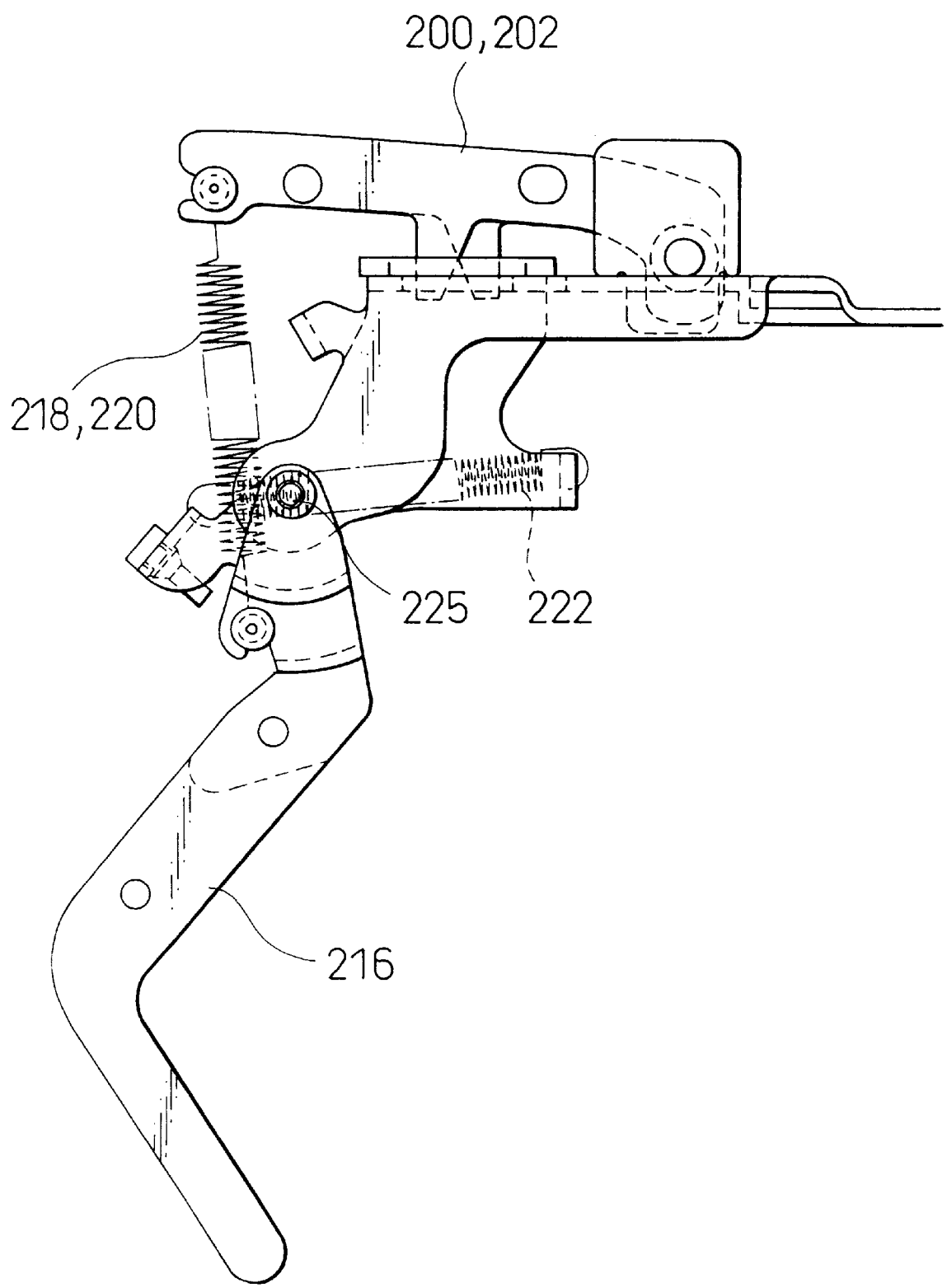
FIG. 21 is a plan view of yet another embodiment of the restraint device relative to the present invention, with the handle located at a neutral position.

According to this embodiment, such actions as follows are resulted. When the handle 216 is rotated from the released state in FIG. 18 to the restraining side so as to restrain the engagement of the connection member, so that the two coil springs 218, 220 are pulled and at the same time the coil spring 222 is pulled. Consequently, at the time, tensile force as strong as to pull the coil spring 222 becomes necessary. When the neutral point in FIG. 21 is exceeded, the coil spring 222 acts to pull the handle 216 counterclockwise, which coincides with the direction to rotate the handle 216, so that the coil spring 222 works to reduce the operation force of the handle 216. By further rotating the handle 216, the two inclined surfaces 201, 203 come into frictional contact with the engagement to restrain the engagement. Since the handle 216 is subjected to the tensile force of the coil spring 222 and the two coil springs 218, 220 turn over in a restrained state, the restrained state is maintained.

Figure 22:
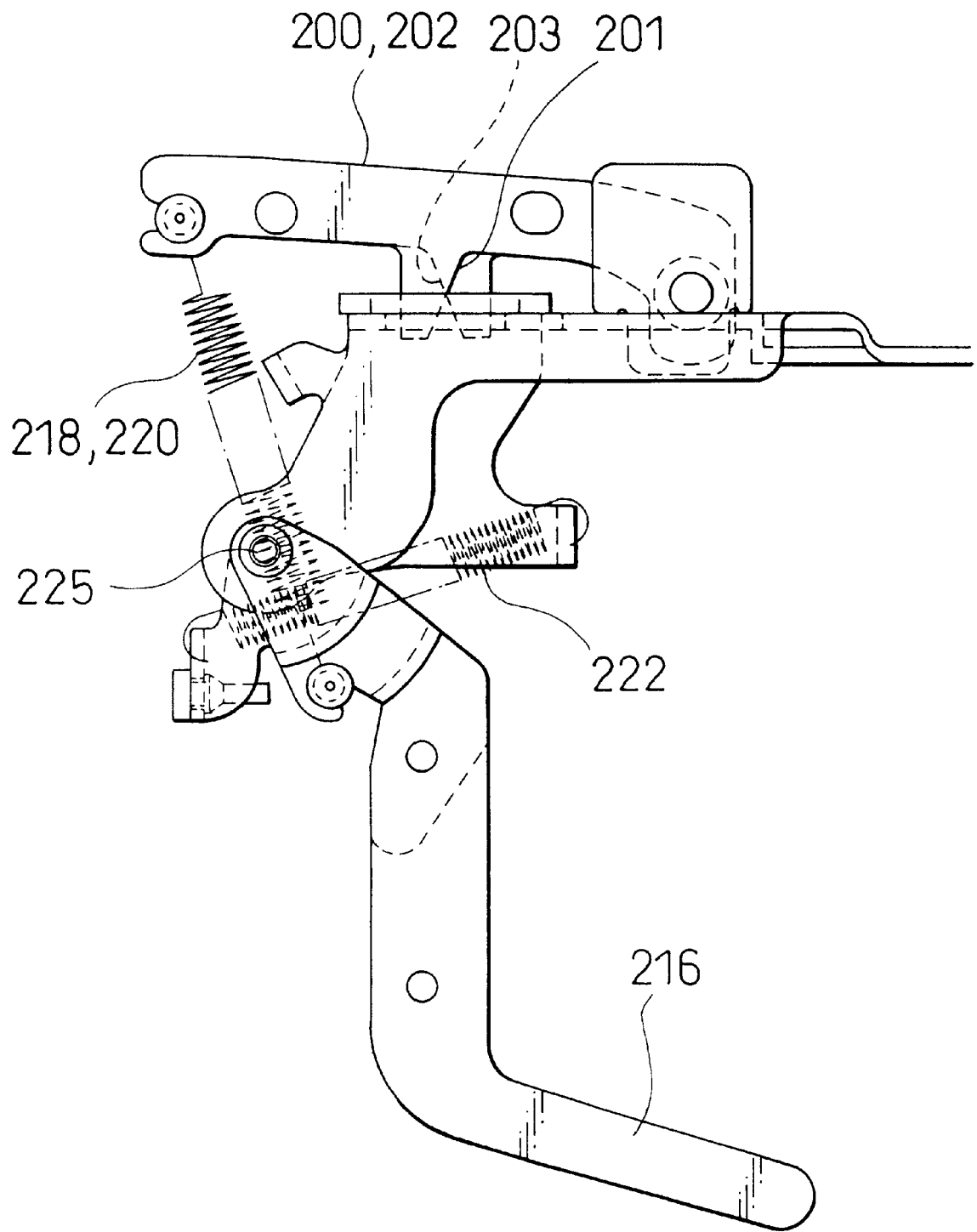
FIG. 22 is a plan view of yet another embodiment of the restraint device relative to the present invention, with the handle located at the restraining position.

To bring the handle 216 to a releasing position, the handle 216 is rotated clockwise from the state in FIG. 22. The coil spring 222 is pulled up to the neutral point in FIG. 21, but after passing the neutral point the coil spring 222 applies tensile force to the handle 216, so that the handle 216 is rotated clockwise until the contact portion 227 abuts against the stopper 228. When the contact portion 227 abuts against the stopper 228, the two lock levers 200, 202 are returned to the releasing position by the two coil springs 218, 220.

Figure 23:
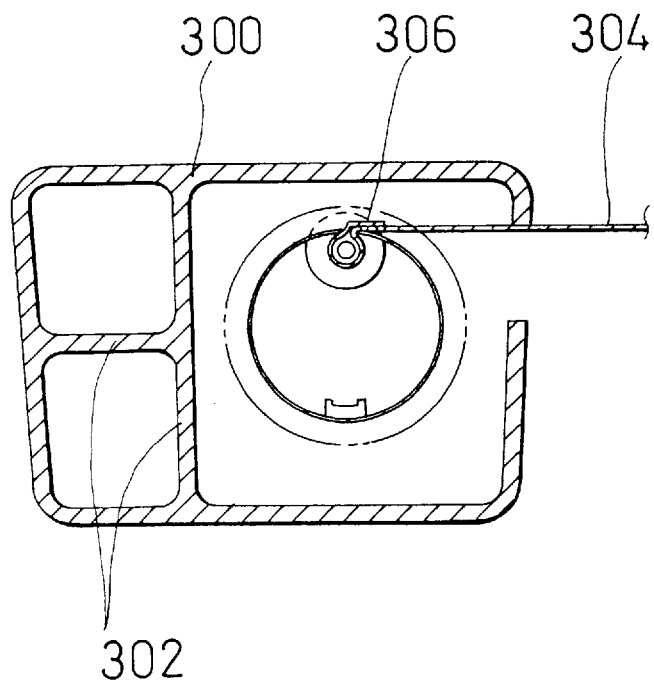
FIG. 23 is a cross section of an embodiment of a connection member usable in the reinforced construction of the rear wheel housings relative to the present invention.
Figure 24:
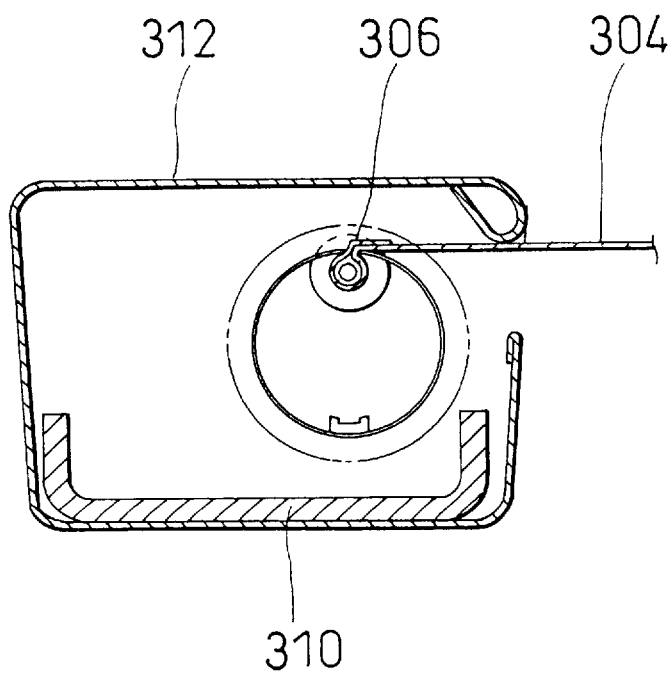
FIG. 24 is a cross section of another embodiment of the connection member usable in the reinforced construction of the rear wheel housings relative to the present invention.
Figure 25:
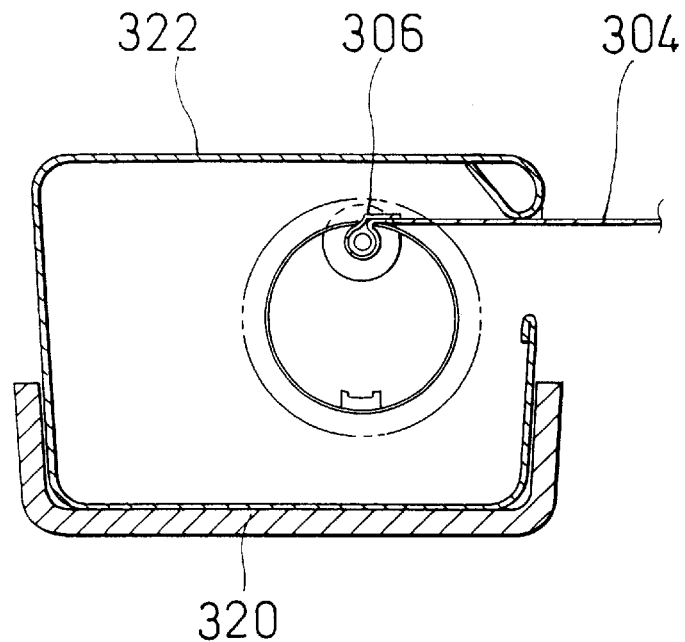
FIG. 25 is a cross section of still another embodiment of the connection member usable in the reinforced construction of the rear wheel housings relative to the present invention.
Figure 26:
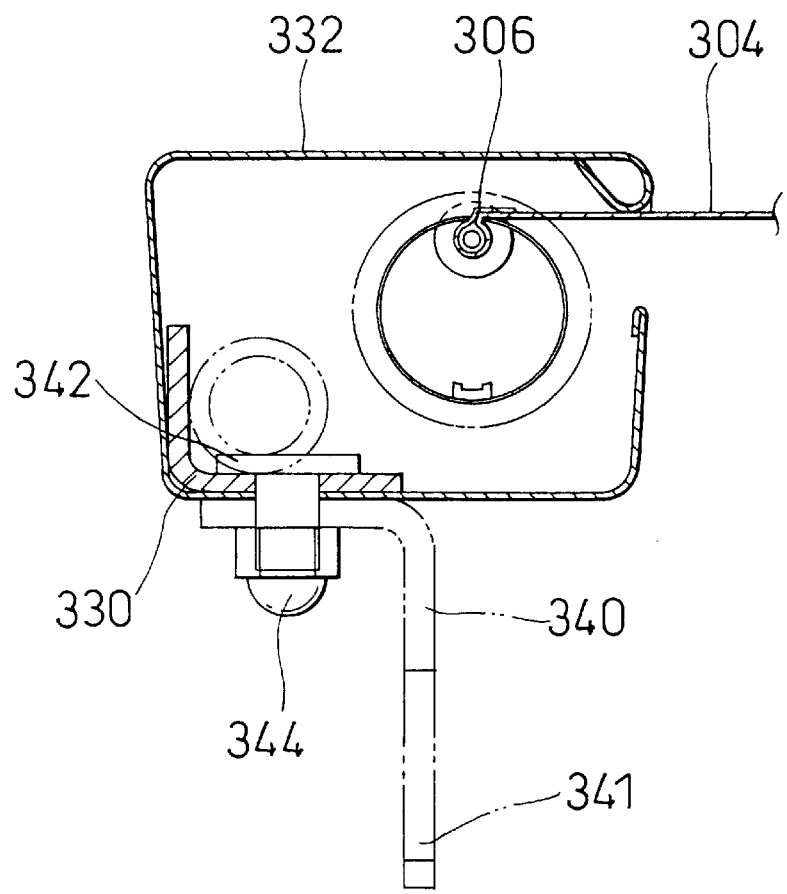
FIG. 26 is a cross section of still another embodiment of the connection member usable in the reinforced construction of the rear wheel housings relative to the present invention.

The connection member preferably supports a tonneau cover. FIGS. 23–26 show such embodiments. A connection member 300 in FIG. 23 is constituted to be hollow by extruding aluminum and providing a suitable rib 302. In the hollow, a winder 306 for winding a tonneau cover 304 by a spring is disposed. The tonneau cover 304 is, when not in use, wound by the winder 306 and accommodated in the hollow. A connection member 310 in FIG. 24 is made by press-forming a steel plate with a hard resin cover 312 covering the entire connection member 310 and is further provided with a space to accommodate the tonneau cover 304 and the winder 306. A connection member 320 in FIG. 25 is made by press-forming a steel plate with a hard resin cover 322 mounted and fixed on the connection member 320 and provided with a space in the resin cover 322 for accommodating the tonneau cover 304 and the winder 306. A connection member 330 in FIG. 26 is made by press-forming a steel plate in L-shape and is disposed at a corner portion of a hard resin cover 332. The cover 332 has a space for accommodating the tonneau cover 304 and the winder 306.

An engagement 340 in FIG. 26 is L-shaped and includes a hole 341. Nuts 344 are screwed into bolts 342 embedded in the connection member 330, and the cover 332 and the engagement 340 are connected to the connection member 330. The engagement 340 can also be applied to the connection member in FIGS. 23–25.

In the restraint device shown in FIGS. 18–22, the engagement of the connection member, when it is in a position for engaging with the inclined surfaces of the two lock levers, functions as mentioned above to be able to achieve its original function. However, in case the connection member is off the restraint device, there is a little possibility of moving the handle 216, and if it is intended to move the handle 216 from the position in FIG. 18 to that in FIG. 22 through the position in FIG. 21, the two coil springs 218, 220 substantially do not work and only the coil spring 222 works because nothing comes into frictional contact with the inclined surfaces of the lock lever. As a result, when the neutral position in FIG. 21 is exceeded, the tensile force of the coil spring 222 works on the handle 216 to abruptly swing the handle 216. In order to prevent an occurrence of such a situation, it is preferable to provide a stopper 350 as shown in FIG. 27.

Figure 27:
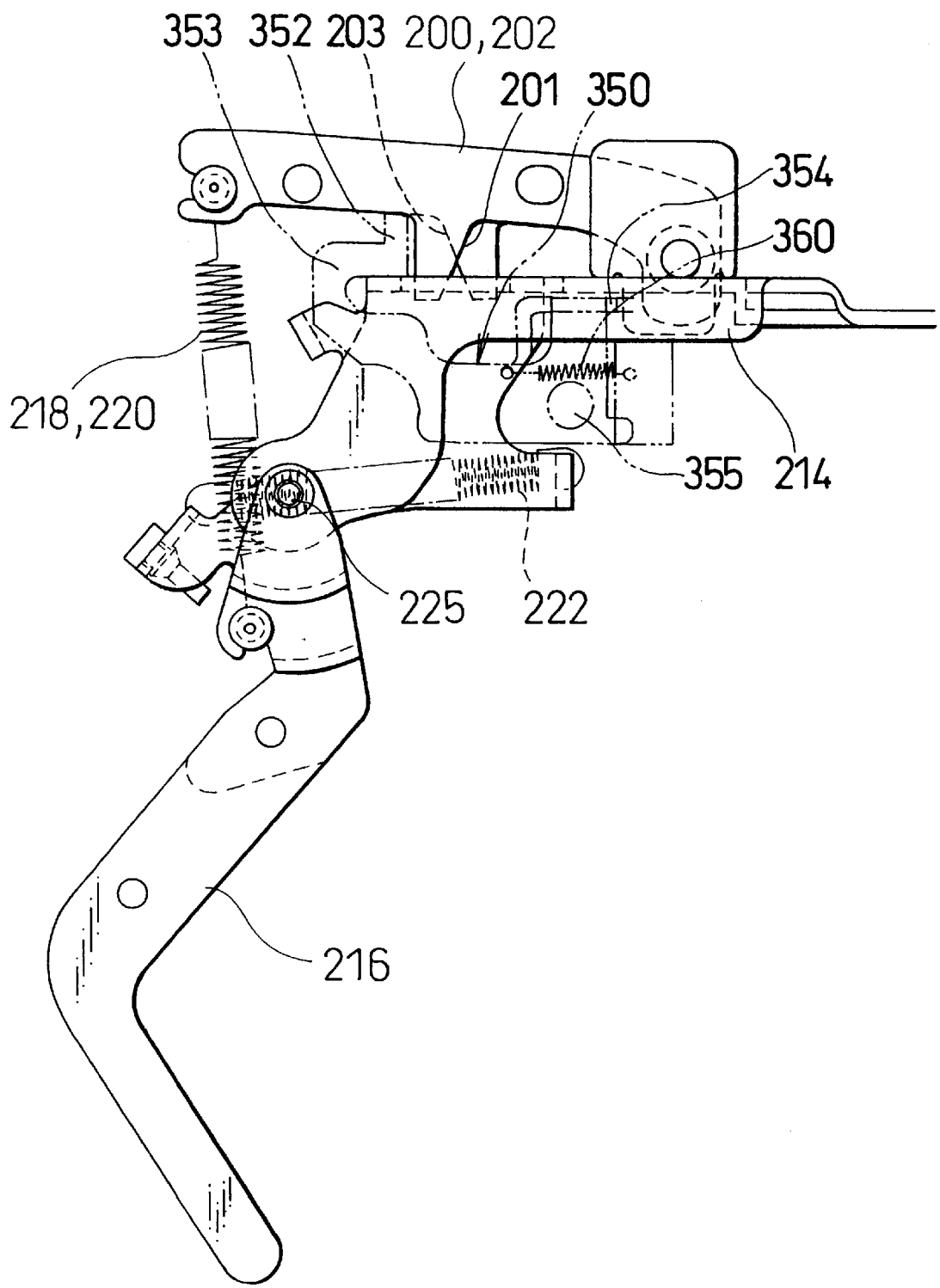
FIG. 27 is a plan view of still another embodiment of the restraint device relative to the present invention, with the handle located at the neutral position and with a movement of the lock lever stopped by a stopper shown by an imaginary line.

The stopper 350 has, as shown in FIG. 27, a stopper portion 352 entering a space between the base 214 and the lock levers 200, 202 when there is no bracket having the engagement of the connection member within the range of movement of the inclined surfaces 201, 203 of the lock levers 200, 202. The stopper portion 352 is dimensioned so as to prevent any further swinging of the lock levers 200, 202 to abut the lock levers when the handle 216 reaches the neutral position or in the vicinity thereof.

Figure 28:
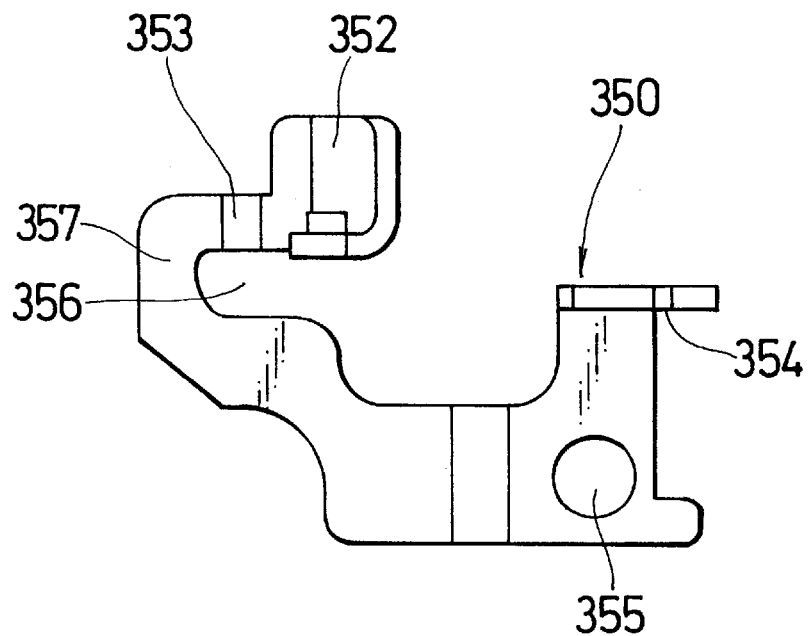
FIG. 28 is a plan view of the stopper.
Figure 29:
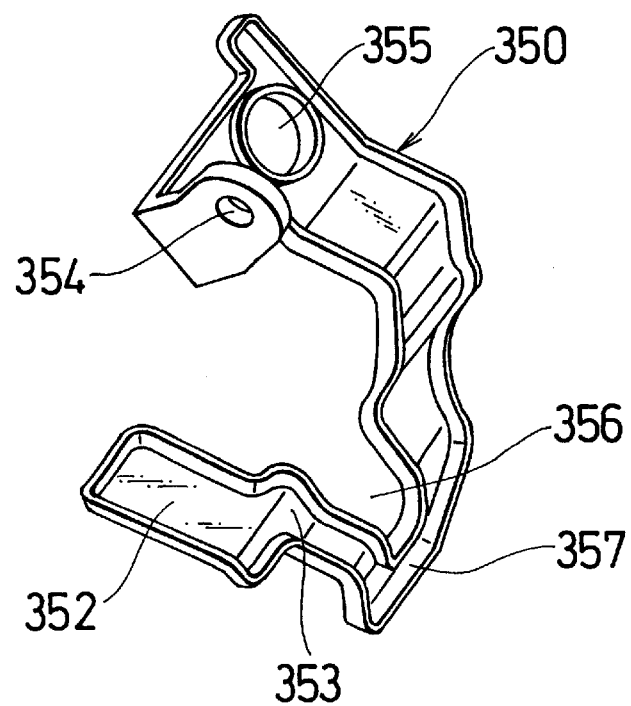
FIG. 29 is a perspective view of the stopper.

The stopper 350 shown in FIGS. 28 and 29 has the stopper portion 352, a contact portion 353, a pivot portion 354 and a hooking portion 355 of the coil spring integrally provided. The stopper portion 350 is formed by bending a sheet of plate material, with a rib erected in the peripheral edge to ensure strength, for making it lightweight. The stopper portion 352 and the contact portion 353 are positioned at one side of a cut portion 356, while the pivot portion 354 and the hooking portion 355 are positioned at the other side of the cut portion 356. Further, the contact portion 353 and the stopper portion 352 are bent at about 90° from a connection portion 357 surrounding the cut portion 356. As shown in FIG. 27 by an imaginary line, this enables the stopper 350 to be mounted on the base 214 with a rivet extending through the pivot portion 354 on the opposite side to the side where the lock levers 200, 202 exist, and further enables the stopper 350 in a state of crossing the base 214 to swing vertically relative to the base 214.

Figure 30:
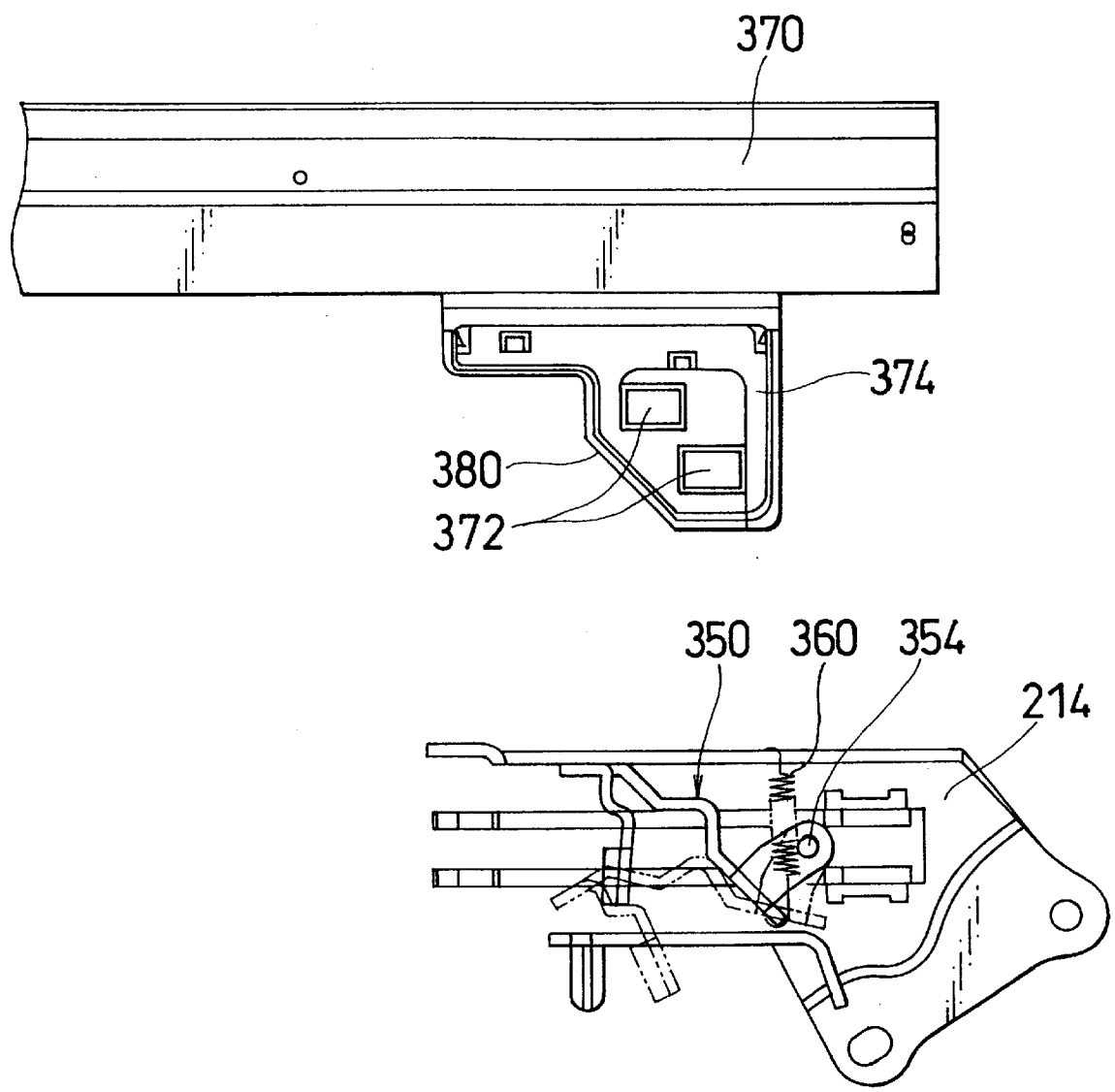
FIG. 30 is a front elevation showing the engagement portion of the connection member and the stopper.
Figure 31:
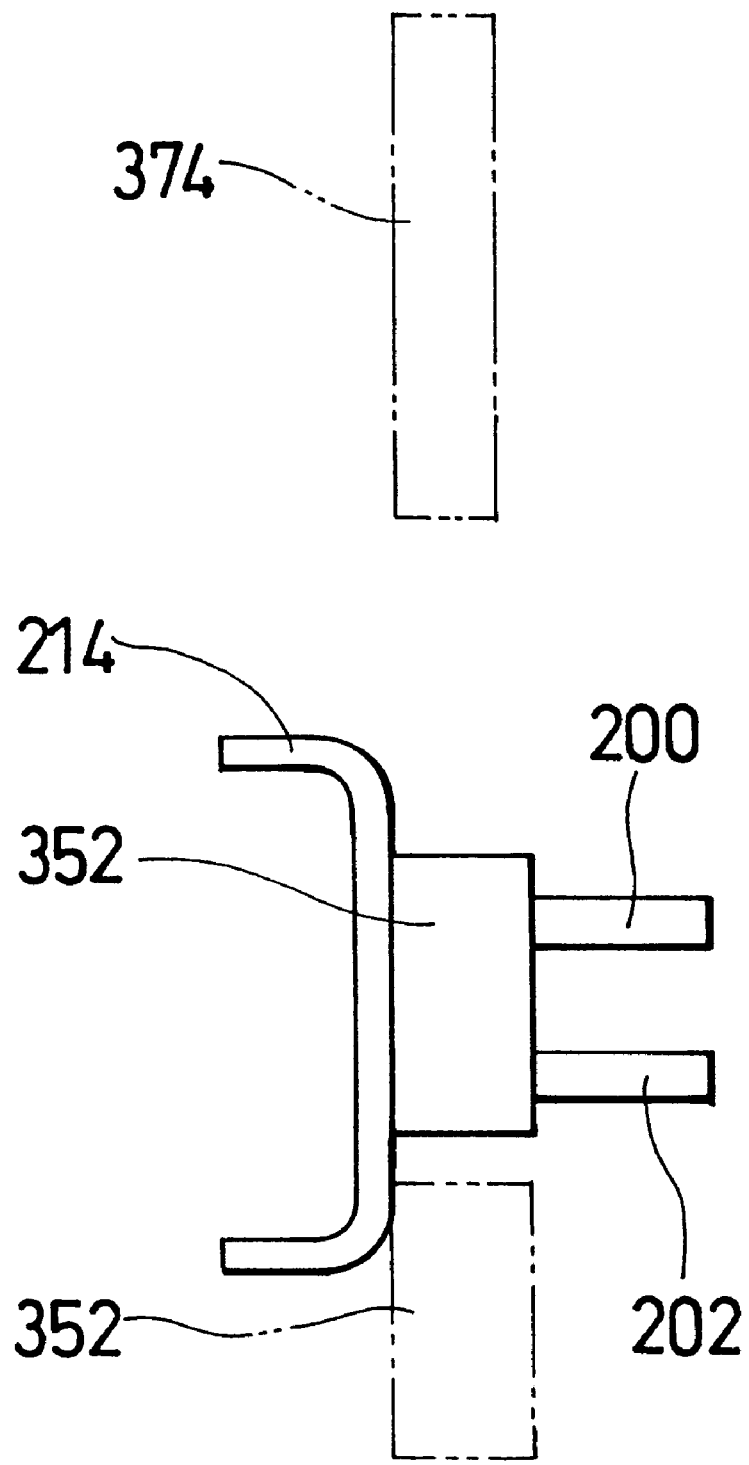
FIG. 31 is a schematic diagram showing an action of the stopper.

As shown in FIG. 30, the stopper 350 is biased upward by a coil spring 360 extended over a part of the base 214 above the pivot portion 354 and the hooking portion 355 and is swingable vertically with the rivet extended through the pivot portion 354 as a fulcrum. As a result, when a bracket 374 having an engagement 372 of a connection member 370 is off the base 214, the stopper 350 is located at a position indicated by a solid line in FIG. 30. With reference to FIG. 31 schematically showing this, the stopper portion 352 enters between the base 214 and the lock levers 200, 202, hindering the lock levers 200, 202 from moving toward the base 214.

The bracket 374 having the engagement 372 of the connection member 370 has an inclined surface 380 at a location inward of the car width. The inclined surface 380, when leading the bracket 374 to a predetermined position so as to restrain the connection member 370, abuts against the contact portion 353 of the stopper 350, and when pressing the entire stopper 350 downward through the contact portion 353, relatively slides with the contact portion 353 and smoothly moves the stopper 350 downward.

As shown in FIG. 27, when the bracket of the connection member is not within the moving range of the inclined surfaces 201, 203 of the lock levers 200, 202, the stopper portion 352 of the stopper 350 enters, as shown in FIG. 31, between the lock levers 200, 202 and the base 214. Consequently, the handle 216 cannot be rotated counter-clockwise from the position in FIG. 27. However, by leading the bracket 374 of the connection member 370 to a predetermined position, the entire stopper 350 is moved downward, so that, as shown in FIG. 31 by an imaginary line, the stopper 352 moves downward to be off the lock levers 200, 202 and the handle 216 is enabled to swing.

What is claimed is:

1. A reinforcing construction in combination with rear wheel housings of an automobile having suspension towers positionable on the right and left side portions of a body of the automobile, comprising:

a connection member having engagement portions at the axial two ends and extended between the right and left suspension towers;

a first restraint device mounted on one of said right and left rear wheel housings to restrain one of said two engagement portions of said connection member; and restraint means mounted on the other of said right and left rear wheel housings to restrain the other of said two engagement portions of said connection member;

wherein said first restraint device includes two lock levers independently and swingably supported on said rear wheel housing and capable of releasing and restraining one of said engagement portions of said connection member, each of the two lock levers having an inclined surface to come into frictional contact with one of said engagement portions when the two lock levers swing so as to restrain one of said engagement portions, and wherein said two inclined surfaces are inclined such that, as the swinging amounts of said lock levers toward restraining one of said engagement portions increase, the frictional force against said engagement portion gradually increases, and that inclination directions in a widthwise direction of the car body are opposite to each other.

2. A reinforcing construction in combination with rear wheel housings of an automobile as claimed in claim 1, wherein said means mounted on the other of said right and left rear wheel housings for restraining the other of said two engagement portions of said connection members is one of:

a) a restraint device of substantially the same structure as said first restraint device;
   b) a second restraint device including one lock lever swingably supported at said rear wheel housing and having two inclined surfaces capable of releasing and restraining the other of said engagement portions of said connection member, the two inclined surfaces coming into frictional contact with the other of the engagement portions when the lock lever swings so as to restrain the other engagement portion, and the two inclined surfaces being inclined such that, as the swinging amount of said lock lever toward restraining said other engagement portion increases, the frictional force against said engagement portion gradually increases and that the inclination directions in the widthwise direction of the car body are opposite to each other; or
   c) a member having two inclined surfaces on two sides and fixed at the rear wheel housing, said two inclined surfaces being inclined so as to spread like a fan from a free end thereof toward the fixed end thereof.

3. A reinforcing construction in combination with rear wheel housings of an automobile as claimed in claim 1, wherein said two lock levers of said first restraint device are disposed at a vertical interval and swing about a vertical axis.

4. A reinforcing construction in combination with rear wheel housings of an automobile as claimed in claim 1, wherein said two inclined surfaces of said two lock levers have the same inclination angle with opposite directions of inclination.

5. A reinforcing construction in combination with rear wheel housings of an automobile as claimed in claim 1, wherein said first restraint device further includes operation means capable of operating said two lock levers simultaneously, and wherein said operating means has one handle swingably supported at said rear wheel housing and two extension coil springs for connecting the handle and said two lock levers, respectively.

6. A reinforcing construction in combination with rear wheel housings of an automobile as claimed in claim 1, wherein said first restraint device further includes operation means capable of operating said two lock levers simultaneously, wherein said operating means includes one handle supported at said rear wheel housings so as to swing about a fulcrum, one auxiliary handle supported at said rear wheel housing so as to swing about a fulcrum positioned between said fulcrum of said handle and the fulcrum of said two lock levers, and two extension coil springs connecting said auxiliary handle and said two lock levers, respectively, and wherein said auxiliary handle is swung by said handle when said handle swings so as to swing two lock levers toward said engagement portion of said connection member.

7. A reinforcing construction in combination with rear wheel housings of an automobile as claimed in claim 6, further comprising a lock holding lever for holding said auxiliary handle in a locking state, wherein the locking of said auxiliary handle by said lock holding lever is released by said handle when said handle swings to a predetermined position so as to release said two lock levers from said engagement portion of said connection member.

8. A reinforcing construction in combination with rear wheel housings of an automobile as claimed in claim 1, wherein said first restraint device further includes operation means capable of operating said two lock levers simultaneously, wherein said operation means has one handle swingably supported at said rear wheel housing, two extension coil springs connecting said handle and said two lock levers, respectively, and an extension coil spring acting to reduce operation force when said handle is swung to a predetermined position by the operation force and attached to said handle and said rear wheel housing.

9. A reinforcing construction in combination with rear wheel housings of an automobile as claimed in claim 8, further comprising a stopper formed so as to hinder said lock levers from swinging when the engagement portion of said connection member is not within a moving range of the inclined surfaces of said lock levers.

10. A reinforcing construction in combination with rear wheel housings of an automobile as claimed in one of claims 5, 6 and 8, wherein said two extension coil springs connected to said two lock levers become turning over when said handle is swung exceeding a predetermined swinging angle so as to direct said lock levers toward said first engagement portion of said connection member, and resist for the handle to swing so as to release said engagement.

11. A reinforcing construction in combination with rear wheel housings of an automobile as claimed in claim 1, wherein said engagement portion of said connection member is a square frame material or a square plate material.

12. A reinforcing construction in combination with rear wheel housings of an automobile as claimed in claim 1, wherein one of said engagement portions of said connection member includes two holes, wherein said two lock levers are supported so as to swing about a common fulcrum, a position where one of said two inclined surfaces and one of said two holes of said engagement portion are brought into contact is substantially coincident in the widthwise direction of the car body with a position where the other of said two inclined surfaces and the other of said two holes of said engagement are brought into contact.

13. A reinforcing construction in combination with rear wheel housings of an automobile as claimed in claim 1, wherein said connection member is formed hollow or has a hollow casing mounted thereon, and wherein said reinforcing construction further comprises a tonneau cover stored in said hollow so as to be pulled out.

14. A restraint device in combination with right and left rear wheel housings of an automobile having suspension towers respectively with a connection member extended between said right and left suspension towers and restrain an engagement portion of the connection member, comprising:

two lock levers being supported on at least one of said rear wheel housings so as to independently swing about a fulcrum, each lock lever being capable of releasing and restraining said engagement portion of said connection member and having an inclined surface to come into frictional contact with said engagement portion of said connection member when the lock lever swings to restrain said engagement portion, wherein said two inclined surfaces are inclined such that, as the swinging amounts of said lock levers toward restraining said engagement portion increases, the frictional force against said engagement portion gradually increases and that inclination directions in a widthwise direction of the car body are opposite to each other.

15. A restraint device in combination with right and left rear wheel housings of an automobile as claimed in claim 14, further comprising means for operating said two lock levers, wherein said operation means includes one handle swingably supported on said at least one of said rear wheel housings and two extension coil springs connecting said handle and said two lock levers, respectively.

16. A restraint device in combination with right a left rear wheel housings of an automobile as claimed in claim 14, further comprising means for operating said two lock levers, wherein said operation means includes one handle supported on said at least one of said rear wheel housings so as to swing about a fulcrum, one auxiliary handle supported on at least one of said rear wheel housings so as to swing about a fulcrum positioned between said fulcrum of said handle and said fulcrum of said lock levers, and two extension coil springs connecting said auxiliary handle and said two lock levers, respectively, and wherein said auxiliary handle is swung by said handle when said handle swings so as to swing said two lock levers toward said engagement portion of said connection member.

17. A restraint device in combination with right and left rear wheel housings of an automobile as claimed in claim 16, wherein said operation means further includes a lock holding lever for holding said auxiliary handle in a locked state, and wherein the locking of said auxiliary handle by said lock holding lever is released by said handle when said handle swings to a predetermined position so as to release said two lock levers from said engagement portion of said connection member.

18. A restraint device in combination with right and left rear wheel housings of an automobile as claimed in claim 14, further including means for operating said two lock levers, wherein said operation means includes one handle supported on said at least one of said rear wheel housings, two extension coil springs connecting said handle and said two lock levers, respectively, and an extension coil spring attached to said handle and said at least one of rear wheel housings, said extension coil spring acting to reduce operation force when said handle is swung to a predetermined position by the operation force.

19. A restraint device in combination with right and left rear wheel housings of an automobile as claimed in claim 18 wherein said operation means further includes a stopper formed so as to hinder said lock levers from swinging when said engagement portion of said connection member is not within a moving range of said inclined surfaces of said lock levers.

20. A restraint device in combination with right and left rear wheel housings of an automobile as claimed in one of claims 15, 16 and 18, wherein said two extension coil springs connected to said two lock levers are disposed such that the axes of said two extension coil springs are transferred from one side of the swinging fulcrum of said handle to the other side in a plane where the axes of said two extension coil springs and the swinging fulcrum of said handle are projected when said handle is swung so as to direct said lock levers toward said engagement portion, thereby to turn over.

21. A restraint device in combination with right and left rear wheel housings of an automobile as claimed in claim 20, wherein said handle operates said two lock levers simultaneously.

22. A restraint device in combination with right and left rear wheel housings of an automobile as claimed in claim 14, wherein said two lock levers are supported at a vertical interval to be swingable about a vertical axis.

23. A restrain device in combination with right and left rear wheel housings of an automobile as claimed in claim 22, wherein the entirety of said restraint device is supported on a base and can be attached to a predetermined position of the rear wheel housing by attaching said base to the rear wheel housing of the car body.

* * * * *

UNITED STATES PATENT AND TRADEMARK OFFICE
CERTIFICATE OF CORRECTION

PATENT NO.    : 6,145,922
DATED         : November 14, 2000
INVENTOR(S)   : M. Shirahama et al.

It is certified that error appears in the above-identified patent and that said Letters Patent is hereby corrected as shown below:

<u>Title page,</u>
After Item [87] and before Item [51], please append the following:

Item -- [30]    Foreign Application Priority Data
        Sep. 24, 1996  [JP]    Japan ……………..8-271298 --.

Signed and Sealed this

Seventeenth Day of December, 2002

JAMES E. ROGAN
*Director of the United States Patent and Trademark Office*